US010268749B1

(12) United States Patent
Roy et al.

(10) Patent No.: US 10,268,749 B1
(45) Date of Patent: Apr. 23, 2019

(54) CLUSTERING SPARSE HIGH DIMENSIONAL DATA USING SKETCHES

(71) Applicant: Amazon Technologies, Inc., Seattle, WA (US)

(72) Inventors: Gourav Roy, Bangalore (IN); Amit Chandak, Bangalore (IN); Prateek Gupta, Bangalore (IN); Srujana Merugu, Bangalore (IN); Aswin Natarajan, Bangalore (IN); Sathish Kumar Palanisamy, Dharmapuri (IN); Gowda Dayananda Anjaneyapura Range, Redmond, WA (US); Jagannathan Srinivasan, Bangalore (IN); Bharath Venkatesh, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 624 days.

(21) Appl. No.: 14/990,161

(22) Filed: Jan. 7, 2016

(51) Int. Cl.
  *G06N 5/04* (2006.01)
  *G06N 99/00* (2010.01)
  *G06F 17/30* (2006.01)

(52) U.S. Cl.
  CPC .. *G06F 17/30598* (2013.01); *G06F 17/30327* (2013.01); *G06N 99/005* (2013.01)

(58) Field of Classification Search
  CPC ............................ G06N 99/005; G06F 17/18
  USPC ..... 706/12; 707/E17.012, E17.044, E17.046, 707/737, 797
  See application file for complete search history.

(56) References Cited

U.S. PATENT DOCUMENTS

| 2009/0240539 A1* | 9/2009 | Slawson ............ G06N 99/005 705/7.29 |
| 2010/0082628 A1* | 4/2010 | Scholz ............ G06F 17/30705 707/740 |
| 2010/0228777 A1* | 9/2010 | Imig ................ G06F 17/30699 707/772 |
| 2012/0191631 A1 | 7/2012 | Breckenridge et al. |

(Continued)

FOREIGN PATENT DOCUMENTS

JP 2009282577 12/2009

OTHER PUBLICATIONS

Ying Zhao, et al., "Empirical and Theoretical Comparisons of Selected Criterion Functions for Document Clustering", Machine Learning, 55, 2004, pp. 311-331.

(Continued)

*Primary Examiner* — Jonathan Han
(74) *Attorney, Agent, or Firm* — Robert C. Kowert; Meyertons, Hood, Kivlin, Kowert & Goetzel, P.C.

(57) ABSTRACT

An approximate data structure to represent clusters of observation records of a data set is identified. A hierarchical representation of a plurality of clusters, including the targeted number of clusters among which the observation records are to be distributed, is generated. Each node of the hierarchy comprises an instance of the approximate data structure. Until a set of termination criteria are met, iterations of a selected clustering methodology are run. In a given iteration, distances of observation records from the cluster representatives of a current version of the model are computed using the hierarchical representation, and a new version of the model with modified cluster representatives is generated.

20 Claims, 13 Drawing Sheets

(56) References Cited

U.S. PATENT DOCUMENTS

| | | | | |
|---|---|---|---|---|
| 2012/0207046 | A1* | 8/2012 | Di Pietro | H04L 41/16 370/252 |
| 2014/0040262 | A1* | 2/2014 | Winter | G06F 17/30778 707/737 |
| 2015/0058554 | A1* | 2/2015 | Gupta | G06F 3/0619 711/114 |

OTHER PUBLICATIONS

Shi Zong, et al., "Generative Model-based Document Clustering: A Comparative Study", Knowledge and Information Systems, 8(3), 2005, pp. 374-384.

Charles Elkan, "Clustering Documents with an Exponential-Family Approximation of the Dirichlet Compound Multinomial Distribution", In Proceedings of the 23rd International Conference on Machine Learning, ACM, Jun. 2006, pp. 289-296.

Inderjit S. Dhillon, et al., "Concept Decompositions for Large Sparse Text Data using Clustering", Machine Learning, 42(1-2), 2001, pp. 143-175.

Inderjit S. Dhillon, et al., "A Divisive Information-Theoretic Feature Clustering Algorithm for Text Classification", Journal of Machine Learning Research 3, 2003 pp. 1265-1287.

Noam Slonim, et al., "Document Clustering using Word Clusters via the Information Bottleneck Method," In Proceedings of the 23rd annual international ACM SIGIR conference on Research and development in information retrieval, Jul. 2000, pp. 208-215.

Inderjit S. Dhillon, et al., "Information Theoretic Clustering of Sparse Co-Occurrence Data", In Proceedings of the Third IEEE International Conference on Data Mining (ICDM'03), Nov. 2003, pp. 517-520.

Arindam Banerjee, et al., "Clustering on the Unit Hypersphere using von Mises-Fisher Distributions", In Journal of Machine Learning Research 6, 2005, pp. 1345-1382.

Graham Cormode, et al., "Sketching Probabilistic Data Streams", In Proceeding of the 2007 ACM SIGMOD International Conference on Management of Data, ACM, Jun. 2007, pp. 281-292.

Moses Charikar, et al., "Finding Frequent Items in Data Streams", In Automata, Languages and Programming, 2002, pp. 693-703.

Graham Cormode, et al., "An improved data stream summary: the count-min sketch and its applications", Journal of Algorithms, 2005, pp. 58-75.

Tian Zhang, et al., "BIRCH: An Efficient Data Clustering Method for Very Large Databases", In ACM SIGMOD '96, vol. 25, No. 2, Jun. 1996, pp. 103-114.

David Arthur, et al., "k-means++: The Advantages of Careful Seeding", In Proceedings of the Eighteenth Annual ACM-SIAM Symposium on Discrete Algorithms, Society for Industrial and Applied Mathematics, Jan. 2007, pp. 1027-1035.

Noga Alon, et al., "The space complexity of approximating the frequency moments", Downloaded from URL: http://www.cse.unsw.edu.au/~cs9314/07s1/lectures/Lin_CS9314_References/space_compexity.pdf, Feb. 22, 2002, pp. 1-19.

Graham Cormode, et al., "Approximating Data with the Count-Min Data Structure", IEEE, Aug. 12, 2011, pp. 1-9.

Graham Cormode, "Sketch Techniques for Approximate Query Processing", Foundations and Trends in Datatbases, NOW Publishers, 2011, pp. 1-64.

"Amazon Machine Learning Developer Guide", Amazon Web Services, Apr. 9, 2015, pp. 1-128.

"Amazon Machine Learning API Reference", Amazon Web Services, API Version, Dec. 12, 2014, pp. 1-124.

U.S. Appl. No. 14/460,163, filed Aug. 14, 2014, Zuohua Zhang.

U.S. Appl. No. 14/489,448, filed Sep. 17, 2014, Leo Parker Dirac, et al.

U.S. Appl. No. 14/460,312, filed Aug. 14, 2014, Leo Parker Dirac, et al.

U.S. Appl. No. 14/318,880, filed Jun. 30, 2014, Leo Parker Dirac, et al.

U.S. Appl. No. 14/319,902, filed Jun. 30, 2014, Leo Parker Dirac, et al.

U.S. Appl. No. 14/460,314, filed Aug. 14, 2014, Leo Parker Dirac, et al.

U.S. Appl. No. 14/463,434, filed Aug. 19, 2014, Robert Matthias Steele, et al.

U.S. Appl. No. 14/569,458, filed Dec. 12, 2014, Leo Parker Dirac, et al.

U.S. Appl. No. 14/489,449, filed Sep. 17, 2014, Leo Parker Dirac, et al.

U.S. Appl. No. 14/484,201, filed Sep. 11, 2014, Michael Brueckner, et al.

U.S. Appl. No. 14/538,723, filed Nov. 11, 2014, Polly Po Yee Lee, et al.

U.S. Appl. No. 14/923,237, filed Oct. 26, 2015, Leo Parker Dirac, et al.

U.S. Appl. No. 14/935,426, filed Nov. 8, 2015, Gowda Dayananda Anjaneyapura Range, et al.

U.S. Appl. No. 14/990,171, filed Jan. 7, 2016, Gourav Roy et al.

U.S. Appl. No. 15/182,366, filed Jun. 14, 2016, Robert Mark Waugh, et al.

* cited by examiner

Examples of "review" text attribute 301

| Record ID | Raw tokens | Token vectors | Token space |
|---|---|---|---|
| OR1 | "Good product, at a great price." | (t1:1, t2:1, t3:1, t4:1) | t1: "good", t2: "product", t3: "great", t4: "price", t5: "shipping", t6: "quick", t7: "poor", t8: "quality", ... |
| OR2 | "Shipping was quick, but poor quality,." | (t5:1, t6:1, t7:1, t8:1) | |
| OR2 | "Great product, quick shipping." | (t2:1, t3:1, t5:1, t6:1) | |

Table 321

Examples of "product" categorical attribute 351

| Record ID | Raw tokens (category tags) | Token vectors | Token space |
|---|---|---|---|
| OR101 | "children's store", "party accessory" | (t1:1, t2:1) | t1: "children's store, t2: "party accessory", t3:"bakeware", t4: "mother's day", t5: "temporary sale", t6:"sports", t7: "outdoors"... |
| OR102 | "Bakeware", "mother's day", "temporary sale" | (t3:1, t4:1, t5:1) | |
| OR103 | "sports", "outdoors" | (t6:1, t7:1) | |

Table 322

FIG. 3 https://<website>.com/clusterModelRequest

Dear <customerName>,

Please enter information about the source of your data set ← 1105
below, for which you would like a clustering model generated.
← 1107

| Data source name | Data source type | URI/location | Optional record schema |
|---|---|---|---|
| <Enter a name for your data source here> | Streaming (default); click here to change | <Enter URL here> | <Enter schema specification here> |

By default, our clustering software will select the algorithms and
metrics used to classify observation records, the initial number ← 1109
of clusters, an initial number of clustering iterations . If you
wish, you can override the default choices by clicking on the
links below. To learn more about the defaults, click here.

| Model name | <Username>-cm0007 (click here to change) |
|---|---|
| Clustering methodology | Spherical K-means using sketches(click here to change) |
| Number of clusters | 1000 (click here to change) |
| Initialization algorithm | Random (click here to change) |
| Number of iterations before reporting results | 5 (click here to change) |
| Clustering quality metric | Normalized mutual information (click here to change) |
| Sketch type | Count-min (click here to change) |
| Cluster tree levels | 4 (click here to change) |

← 1111

1113

Start model training

CLUSTERING SPARSE HIGH DIMENSIONAL DATA USING SKETCHES

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Clustering, or partitioning a set of observation records into multiple homogeneous groups or clusters based on similarities among the observations, is one of the more frequently used machine learning techniques. For example, at web-based retailing organizations, observation records associated with customer purchases or customers' web-page browsing behavior may be clustered to identify targets for customized sales promotions, advertising, recommendations of products likely to be of interest, and so on. Clustering may also be used as one of the steps in generating predictive machine learning models from raw observation records, e.g., to derive features with higher predictive utility than the raw observations, to reduce dimensionality, or simply to compress the raw data. Observation records may sometimes be clustered to help interested parties (e.g., managers or other decision makers at the organizations at which observation records are collected) gain additional insights into relationships among different segments of the data, e.g., to help decide as to how a given data set can best be utilized for business purposes.

Observation records of machine learning data sets may include values of a number of different types of attributes, such as numeric attributes, binary or Boolean attributes, categorical attributes and text attributes. In some cases, the dimensionality of one or more attributes may be very high, and/or the values of individual tokens of the attributes may be very sparsely distributed. For example, tens of thousands of different words may be present among the values of a particular text attribute across the set of observation records of a data set, with most words occurring only in a small fraction of the observations. Some clustering algorithms may run into significant memory and/or computational bottlenecks when handling high-dimensionality sparse data, leading to poor scalability as the data set sizes increase.

BRIEF DESCRIPTION OF DRAWINGS

FIG. 3 illustrates examples of data sets with high-dimensionality sparse attributes, according to at least some embodiments.

FIG. 11 illustrates an example programmatic interface which may be implemented at a machine learning service which supports scalable clustering for sparse high-dimensionality data, according to at least some embodiments.

Figure 1:
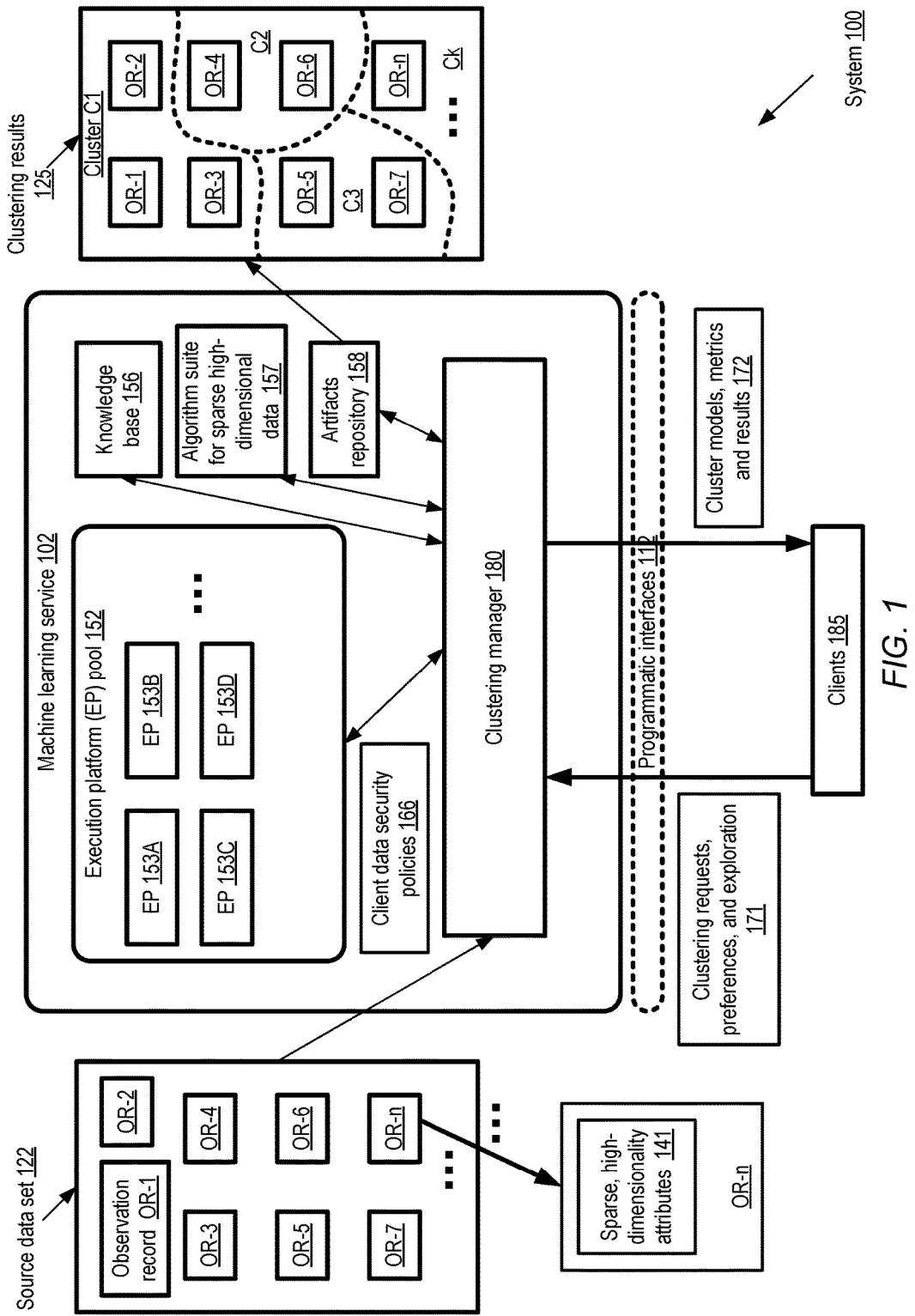
FIG. 1 illustrates an example system environment in which scalable clustering algorithms utilizing probabilistic or approximate data structures may be implemented for sparse high-dimensionality data at a machine learning service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing efficient clustering for large data sets whose observation records comprise sparse, high-dimensionality attributes (e.g., text attributes or categorical attributes with a large number of categories) are described. In various embodiments, approximate data structures called sketches may be used to store the contents of respective cluster representatives for the targeted set of clusters for such data sets, thereby reducing memory requirements substantially compared to alternative approaches. It is noted that the terms "approximate data structure" and "probabilistic data structure" may be used synonymously herein when referring to data structures such as sketches that provide concise or memory-efficient summaries of observation records. In at least one embodiment a respective tree-structured representation of each version of the clustering model may be generated to reduce the number of distance computations that have to be performed to assign observation records to clusters. In some embodiments, the techniques and algorithms described herein may be implemented at a network-accessible machine learning service of a provider network, and may not require expertise in statistics or machine learning on the part of the clients on whose behalf the techniques are implemented. For example, intelligent default options may be selected at the machine learning service, e.g., based on the schema identified for the data set, a preliminary analysis of at least some observations of a data set and/or based on contents of a knowledge base, for a number of parameters of the clustering algorithms. The parameters for which default values may be selected at the service may include, for example, the specific kinds of approximate or probabilistic data structures such as sketches which are to be used to reduce memory footprints, whether hierarchical (e.g., tree-structured) representations of the models are to be employed or not to reduce computation workloads, the number of levels in the hierarchy if a hierarchical representation is used, distance metrics for different types of attributes, termination or convergence criteria and the like as described below. At the same time, mechanisms may be implemented to allow more knowledgeable clients to indicate preferences or requirements for various aspects of the clustering methodology, to change parameters based on interim results, to request termination of the algorithm, and so on.

Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

A machine learning service implemented at a provider network may have access to large numbers of execution platforms for implementation of the clustering algorithms and/or other machine learning algorithms, as well as to the resources of other services (such as storage or database services at which raw or processed data sets may be stored, or at which artifacts representing clustering models or model parameters may be stored). For different data set sizes, respective amounts of resources including execution platforms with the appropriate performance capabilities may be selected at the machine learning service. In some cases, different sets of resources may be utilized for respective iterations of the clustering algorithm, depending for example on the changing needs of the algorithm as convergence is neared, and/or depending on the available resources in the machine learning service's resource pools. Various security-related, data durability-related, and fault-tolerance-related techniques may also be implemented at the different services of the provider network, including the machine learning service, so that a range of service level requirements of clients can be met. For example, because of the fault tolerance levels supported for the execution platforms of the machine learning service, the probability of losing the interim or final results of a clustering algorithm due to failures may be reduced. Security policies associated with the machine learning service may, for example, require that observation records and/or associated results are deleted from the execution platforms after the computations associated with any given iteration of the clustering algorithm being used have been completed (so that the observations cannot be viewed by any other clients to whom the execution platforms may be assigned by the service). In some embodiments, clients may be able to indicate budget limits associated with clustering a given data set, and the service may automatically adjust parameters of the clustering algorithm accordingly. The machine learning service may also implement a number of easy-to-use programmatic interfaces in some embodiments, such as web-based consoles, application programming interfaces or APIs, command line tools, and/or graphical user interfaces, enabling clients to indicate source data sets for clustering requests, specify clustering-related preferences or requirements, view interim and/or final results of the clustering algorithms employed, and so on.

According to one embodiment, computing devices of the machine learning service may identify a data source from which the observation records of a given data set for which a clustering algorithm is to be implemented can be obtained. A number of different kinds of data sources may be supported in different embodiments, including pre-collected data stored at a provider network storage service, database service or a client's own storage resources, streaming data collectable from one or more network endpoints, result records generated by a different machine learning algorithm, and so on. The details of a given data source, such as a URL or storage device identifier or address, may be provided by a client via a programmatic interface in some embodiments as mentioned above. With respect to at least some types of data sources such as streaming data sources, in various embodiments the machine learning service may establish and maintain network connections to each data source to obtain the corresponding observation records (e.g., persistent connections which are each used for multiple observation records may be set up). In some embodiments a client may provide a schema which indicates the data types and/or other characteristics (such as permitted value ranges, tokens which are to be considered indications of invalid or "not available" data, etc.) of different attributes of the observation records, while in other embodiments the machine learning service may identify the attribute types on its own. In various embodiments, the observation records of a data set may contain values for many different attribute types, including for example numeric, categorical, binary or Boolean, as well as text or text-like attribute types, at least some of which may exhibit high dimensionality and sparseness characteristics. The techniques described for clustering high-dimensional sparse data may be applied for any type of attribute or combinations of attributes in some embodiments—e.g., the techniques are not limited to text or categorical attributes.

In some embodiments, the machine learning service may determine whether a given data set meets a set of high dimensionality and/or sparseness criteria before selecting distance metrics, approximate data structures and other parameters for a clustering methodology to be applied to the data set. In one embodiment a schema corresponding to the data set may be sufficient to indicate whether the data set meets the sparseness and/or high-dimensionality criteria, while in other embodiments a sample of the data set may be examined and analyzed to check whether the criteria are met. Any of a number of different clustering methodologies may be selected in different embodiments, such as a variant of a generalized K-means algorithm, a K-medians algorithm, a K-harmonic-means algorithm, a MeanShift algorithm, and so on. Respective distance metrics may be selected (e.g., based on analysis of the schema and/or based on detection of the attribute data types) for assigning the different high-dimensionality attributes to clusters, such as a cosine similarity metric or a Bregman divergence metric (such as a Kullback-Leibler (KL) divergence metric). A technique for generating a combined or aggregated distance metric from the individual per-attribute distance metrics may be identified in various embodiments, e.g., using normalization factors selected for the respective distance metrics for individual attributes. In embodiments in which the service determines that data structures such as sketches should be used for representing clusters, the particular type of data structure, such as a count-min sketch, a count sketch, or an AMS (Alon Matias Szegedy) sketch may be selected for the data set. In some embodiments, the type of data structure used may be selected based at least in part on the properties of weights which may be assigned to the tokens of the high-dimensionality attributes: for example, if the weights are positive, count-min sketches may be used, and if the weights can take either positive or negative values, count sketches may be used. In one embodiment, the type of sketch (or other approximate data structure) used may be selected based at least in part on the schema or detected attribute type. In some embodiments, depending for example on the properties of different kinds of attributes present in the observation records, a cluster representative may include a sketch as well as other data structures (e.g., numeric scalars may be used for some attributes, or a token vector may be used for a non-sparse or low-dimensionality attribute).

In some embodiments, depending for example on the total number of clusters among which the observation records of the data set are to be distributed, a hierarchical representation of the clustering model may be generated, e.g., so as to reduce the total number of distance computations that have to be performed to assign observation records to clusters. For example, if the targeted number of clusters is 1000, a tree with 1000 leaf nodes (with each leaf node corresponding to a cluster representative of one of the targeted clusters) may be generated, with non-leaf nodes generated based on applying an aggregating function (such as a union function) to a collection of child nodes. When determining the particular cluster to which a given observation record should be assigned during a given iteration of the selected clustering methodology, the tree may be traversed from its root node towards the leafs, selecting the particular node at the next level in the hierarchy from among the children nodes of the current node being traversed based on the respective distances of the given observation record from the children. In this approach, instead of computing distances from all 1000 cluster representatives, fewer comparisons may be required for cluster assignment (with the exact number varying with the number of levels in the tree and the fan-outs at each level). Parameters governing the shape of the tree (e.g., the total number of levels, and the fan-outs at each level) may be selected by the machine learning service. Corresponding to each node in the tree, a respective pair of sketches (one representing the current version of the clustering model, and one representing the next version) may be maintained in some embodiments; that is, in effect, two versions of the tree may be maintained at a given point in time during the execution of the clustering algorithm. In some embodiments, e.g., based on the total number of clusters, the machine learning service may determine that a hierarchical or tree-shaped arrangement of clusters is not required—e.g., that the advantages gained by generating the hierarchical arrangement are not likely to outweigh the costs of generating the tree. In the latter scenario, iterations of the selected clustering algorithm may be implemented without generating a hierarchical data structure representing the clusters. Some or all of the choices and decisions regarding the clustering methodology to be employed may be based on contents of a knowledge base of the machine learning service in some embodiments—e.g., on knowledge base entries which indicate how successful previous parameter selections turned out to be for similar data sets or similar problem domains.

An initial version of the cluster model may be identified, e.g., indicating the respective cluster representatives of a selected number of clusters among which the observation records are to be distributed. Respective sketches may be generated corresponding to each cluster representative. One or more iterations of the clustering methodology may then be implemented. In a given iteration, the distance measures of the observation records may be computed with respect to the cluster representatives of the current version of the clustering model, and the observation records may be assigned to clusters of the current version of the model based on those distances. The cluster representatives for a new or updated version of the model may then be computed, e.g., based on the updated assignments of the observation records, and the updated version of the model may be used as the current version for the next iteration. The iterations may be performed until one or more termination criteria are met in various embodiments—for example, until the fraction or number of assignment changes made during an iteration falls below a threshold, or until a cost function evaluated for the clustering model reaches a threshold. In at least some embodiments the termination criteria may be indicated programmatically by a client—e.g., a client may indicate the maximum number of iterations to be executed, or the resource or budget constraints which are to trigger termination.

After the iterations of the selected clustering methodology are concluded, in various embodiments, information indicating the most recent version of the model (e.g., the cluster representatives, and/or the assignments of different observation records to the clusters) may be stored, e.g., in an artifact repository or database associated with the machine learning service. In at least one embodiment, various aspects of the results of the use of the clustering methodology may be indicated programmatically to clients of the machine learning service. For example, an overview or summary of the cluster definitions (e.g., the attribute values corresponding to the cluster representatives) may be provided, indications of the relative discriminative utilities of the different attributes (e.g., how useful or influential the different attributes are relative to each other with respect to classifying the observation records into clusters) may be provided, the populations of the different clusters may be indicated, and so on. In one embodiment the information may be provided in a layered manner, with interfaces enabling clients to obtain more details for various subsets of the results as desired. In some embodiments, clients may be provided interim results at various stages of the execution of the algorithm, e.g., indicating the current version of the model and some measure of the quality of the current version and the cost of additional iterations, so that the clients can decide whether additional iterations are to be implemented or not. In some embodiments, the set of execution platforms to be used for a given iteration may be selected dynamically at the start of each iteration, e.g., based on an estimate of the available resources of the machine learning service and/or based on the expected requirements of the next iteration.

At various stages of the clustering algorithm, the machine learning service may utilize a number of input sources to guide or determine subsequent actions in some embodiments. As mentioned earlier, contents of a knowledge base of the machine learning service may be examined to select or modify model parameters, client feedback or requests obtained via the programmatic interfaces may be analyzed, resource capacity measures provided by monitors associated with the machine learning service itself may be consulted to select execution platforms, billing amounts associated with the clustering algorithm may be considered, and so on. Using this flexible approach, a framework that enables efficient, scalable and customizable clustering of a wide variety of high-dimensionality sparse data sets may be supported in various embodiments.

Example System Environment

FIG. 1 illustrates an example system environment in which scalable clustering algorithms utilizing probabilistic or approximate data structures may be implemented for sparse high-dimensionality data at a machine learning service, according to at least some embodiments. As shown, system 100 includes various resources associated with a machine learning service 102, including execution platforms (EPs) 153 (e.g., EP 153A-153D) of an execution platform pool 152 used for computations required for various clustering and other machine learning algorithms, and a clustering manager 180 responsible for orchestrating the selection, parameterization and execution of clustering algorithms for observation records of various data sets. The clustering manager 180 may itself comprise software and/or hardware components a plurality of computing devices in some embodiments. The machine learning service 102 may be implemented at a provider network in some embodiments as mentioned earlier. In addition to the machine learning service 102, various other services may also be implemented using the resources of the provider network in the depicted embodiment. For example, data sources for the data sets to be clustered (including source data set 122) may be stored at least temporarily at a storage service or a database service of the provider network in some embodiments.

In addition to the clustering manager 180, the machine learning service 102 may comprise a knowledge base 156, a library or suite 157 of clustering algorithms for sparse high-dimensionality data, and/or an artifact repository 158 in the depicted embodiment. The knowledge base 156 may represent a growing collection of records representing insights gained during earlier instances of the use of various clustering approaches for a variety of data sets, and may be used to guide some of the decisions made by the clustering manager 180, e.g., in scenarios in which clients 185 allow the machine learning service to select parameters for clustering. A number of clustering algorithms may be included in suite 157, such as various variations of generalized K-means, K-medians, K-harmonic-means, MeanShift, and the like, any of which may be applied to a given data set 122 based on selection by the clustering manager and/or based on client input. The artifacts repository 158 may be used to store interim and/or final results of the clustering methodologies being used, values of the parameters selected for the methodologies, and so on.

Clustering manager 180 may implement one or more programmatic interfaces 112 for interactions with clients 185 of the machine learning service in the depicted embodiment. The interfaces may include, for example, one or more web-based consoles or web pages, application programming interfaces (APIs), command-line tools, graphical user interfaces (GUIs) or the like. Using interfaces 112, clients 185 may, for example, submit clustering requests or preferences 171 and/or perform exploration of clustering results. The clustering manager 180 may provide indications of clustering models, metrics and/or results 172 (including for example intermediate results corresponding to various iterations of a selected clustering methodology or algorithm, or final results after the iterations have been completed) via the programmatic interfaces 112. The clustering manager may enforce one or more client data security policies 166 in the depicted embodiment. For example, according to one such policy, observation records which were copied to a given execution platform 153 for a particular clustering algorithm iteration on behalf of a particular client 185 may have to be deleted from that execution platform after the computations of that iteration are completed, so that the data cannot be examined by any other client to whom that execution platform may later be assigned. According to other security policies 166, observation records, model parameters, interim or final results of clustering algorithms may be stored and/or transmitted over network links in encrypted formats.

In one embodiment, a client 185 of the machine learning service may provide information (e.g., a network address, a database address, and/or a storage device address) regarding a data source from which observation records (ORs) of a data set 122 for which clustering is to be performed can be obtained by the clustering manager 180. Some or all of the observation records, such as OR-1 through OR-n of data set 122, may comprise attributes 141 containing sparse high-dimensionality data. Such sparse high-dimensionality attributes may include, for example, text attributes, categorical attributes, and/or raw or derived numeric attributes (e.g., raw numeric attributes may be mapped to range buckets, and the bucketed derived attributes may be sparse and exhibit high-dimensionality.) In one embodiment, a client 185 may specify the schema of a data set 122—e.g., the types and formats of the different attributes, the sequence in which the attribute values appear in the observation records, constraints on allowed values of attributes, and so on may be specified via programmatic interfaces 112. Clients may also indicate respective weights to be attached to some set of values or tokens of the high-dimensionality attributes, or to individual attributes, in some embodiments—for example, weights may be assigned based on the subjective importance levels attached to the attribute or values by the client according to the client's business goals. Such weights may be used by the clustering manager 180 to determine normalized distance metrics, for example. In one embodiment the ranges of the weights may be used to select sketch types or other approximate data structures—e.g., one type of data structure may be more suitable for real-valued weights, while another type of data structure may be better suited for non-negative weights.

Based at least in part on the different kinds of attributes which form the observation records, the clustering manager 180 may determine various parameters and properties of the clustering methodology to be applied to data set 122 in the depicted embodiment. For example, the kinds of compressed approximate data structures (such as sketches of a selected type) to be used to represent clusters, the number of clusters into which the observation records are to be distributed, properties of a hierarchical balanced-tree structure to be used to represent clusters, as well as a particular clustering algorithm (selected from suite 157) such as generalized K-means, generalized K-medians, generalized K-harmonicmeans, or another similar approach may be selected. Corresponding to the clustering methodology, a cluster initialization technique (governing the manner in which initial cluster representatives of the selected number of clusters are to be identified), respective distance metrics for different attributes of the observation records, weights (if any) to be assigned to tokens when computing distances, and/or normalization techniques to be applied to the different attributes may be selected. In some cases, one or more of the parameters may be selected based at least in part on client requests or preferences, and/or based on contents of the knowledge base 156. In various embodiments, some or all of the parameters may be selected without specific guidance from clients; in general, the extent of the client's participation with respect to the clustering methodology and parameter selection may depend on the client's preference. Some clients may simply indicate a source of the data set 122 and leave the modeling decisions to the clustering manager; other clients, who are more conversant with the statistics involved or who are experts in the subject matter or domain for which the observation records are collected, may provide more detailed guidance or preferences with regard to the modeling decisions.

After the model methodology parameters have been established, one or more clustering iterations may be performed in the depicted embodiment. A given iteration may involve two version of the cluster model (e.g., with each version comprising one collection of cluster representatives such as centroids in the case of K-means clustering) in various embodiments. In one embodiment, the distances of the various observation records from the cluster representatives of one version of the model may be computed and used to assign the observation records to the clusters of that version. A cost function associated with the current version of the model may also be computed in various embodiments. If termination criteria for the modeling methodology (which may be based at least in part on the cost function and/or may be indicated programmatically by the client) are met, no additional iterations need be implemented, and the clustering results 125 (e.g., the current version of the model, and the assignments of the observation records to the set of clusters of the current version) may be stored, e.g., in artifacts repository 158. If the termination criteria are not met, a modified or updated version of the model may be generated, in which new cluster representatives may be determined for at least some of the clusters (e.g., based on the most recent assignments of the observation records to the clusters).

The programmatic interfaces 112 may be used to provide updated results (e.g., the definitions of cluster representatives of clusters C1-Ck in the results 125 of the current version of the cluster model) as they become available, on an ongoing or real-time basis, to clients 185 in some embodiments. The notification mechanisms to be used for providing cluster results, corresponding quality estimates, measures of resource usage or billing costs, and so on, may be selectable by the clients in some embodiments. In other embodiments, clients may only be notified after either a pre-determined termination criterion for the clustering has been met, or if resources designated for the clustering have been exhausted. In some embodiments, clients may use programmatic interfaces to indicate the clustering algorithms (for example, by providing code for algorithms) to be use on their behalf. In one embodiment, a pluggable general-purpose architecture may be used for implementing a number of clustering algorithms, in which the particular algorithm and corresponding parameters may be changed from one data set to another, while the clustering manager selects the particular execution platforms to be used for a given combination of a data set and clustering algorithm. In various embodiments, numerous instances of one or more clustering methodologies may be executed concurrently using different subsets of the execution platforms available in pool 152—e.g., one data set may be analyzed via a generalized K-means algorithm on behalf of one client using execution platforms EP 153A and EP 153B at the same time that another instance of the K-means algorithm is being applied to a different data set using EPs 153C and 153D. The set of computation resources, memory resources and/or storage resources being used for a given clustering data set 122 may change from one iteration to another in some embodiments, e.g., based on the estimated resource requirements of the iterations, the available capacity in resource pools such as 152, priorities indicated for the data set by clients 185, and so on.

Iterative Clustering Algorithm for Sparse High-Dimensionality Data

Figure 2:
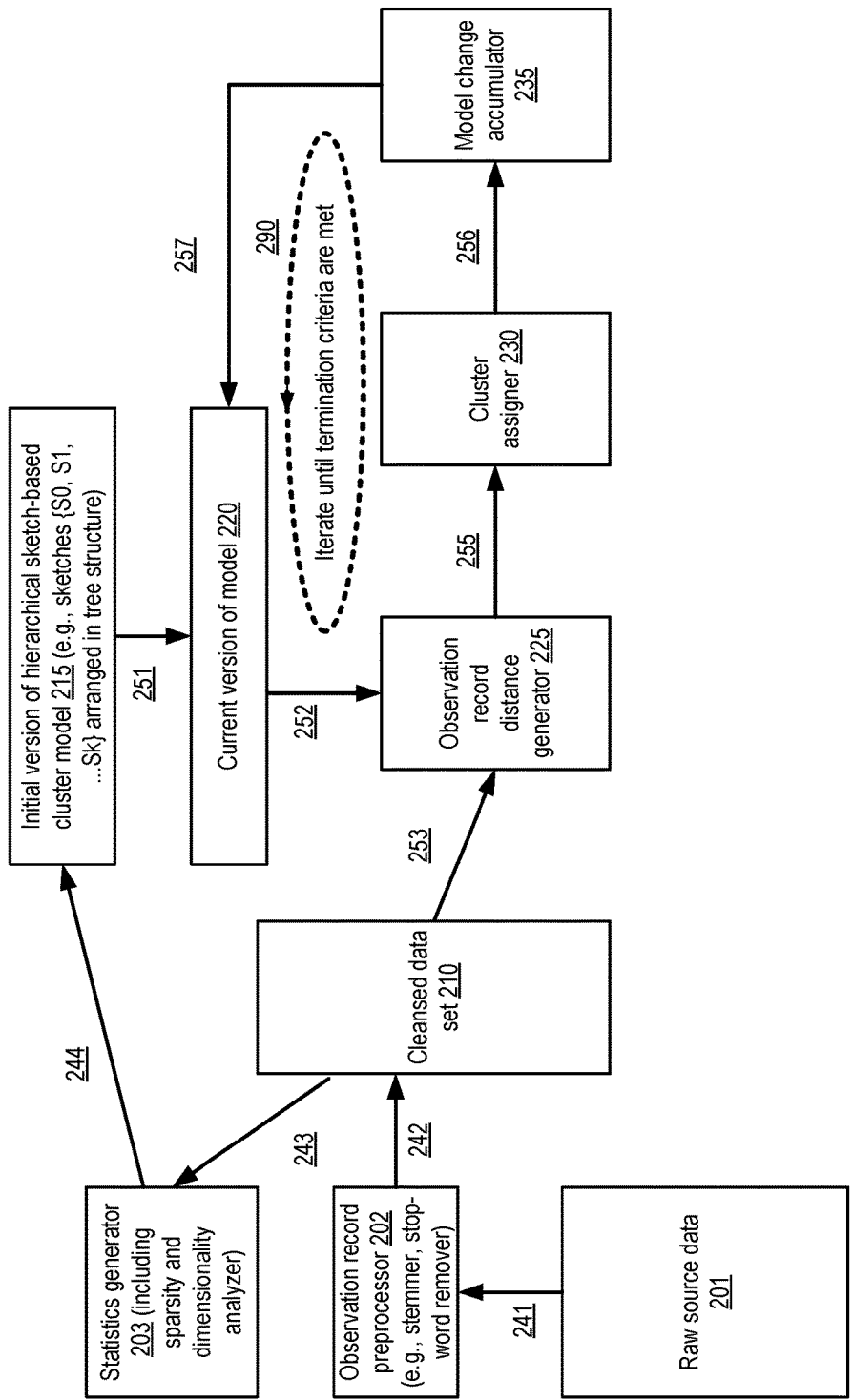
FIG. 2 illustrates a high-level overview of an iterative clustering methodology for sparse high-dimensionality data, according to at least some embodiments.

FIG. 2 illustrates a high-level overview of an iterative clustering methodology for sparse high-dimensionality data, according to at least some embodiments. A set of cleansing operations (such as word stemming, case conversion, and stop word removal) may be performed on at least some attributes of raw source data 201 by an observation record preprocessor 202 in the depicted embodiment, resulting in the cleansed version 210 of the data set, as indicated by arrows 241 and 242. A statistics generator 203 may then analyze at least a subset of the cleansed data set 210 in some embodiments, as indicated by arrow 243. The statistics generator may determine, for example, whether the data set meets sparsity and dimensionality criteria which trigger the use of a particular kind of clustering model. For those data sets which meet selected sparsity and high-dimensionality criteria, an initial version of a hierarchical sketch-based clustering model 215 may be generated, as indicated by arrow 244. The initial version 215 may include respective sketches $\{S1, S2, \ldots\}$ corresponding to the number of target clusters to which the observation records of the data set are to be assigned. Any of a number of different approaches may be taken to identifying the cluster representatives of the initial version of the model in various embodiments—e.g., the representatives may be chosen at random, or (in scenarios in which the K-means clustering algorithm is to be used) a variant of the K-means++ approach may be used, in which observation records which are more distant are more likely to be selected as representatives in the initial model.

After the initial version of the model 215 has been identified, a number of iterations involving operations corresponding to loop 290 may be performed in the depicted embodiment. Distances of the observation records from the cluster representatives included in a current version of the model 220 (set to initial version 215 for the very first iteration, as indicated by arrow 251) may computed by distance generator 225 (as indicated by arrows 252 and 253). Any of several different distance metrics may be selected for various kinds of attributes in different embodiments, such as cosine similarity metrics, Bregman divergence metrics, and so on. In various embodiments the per-attribute distance metrics may be normalized and combined to obtain an aggregate multi-attribute distance metric for the observation records—that is, the distances computed may take all the different attributes of the observation records into account. The distances may then be used to by cluster assigner 230 to identify the respective clusters in which the observation records should be placed, as indicated by arrow 255. If the termination criteria selected for the data set or methodology are not met, an updated or modified set of cluster representatives may be generated. Model change accumulator 235 may combine the new cluster representatives with unchanged cluster representatives (if any) to derive the updated version of the model as indicated by arrow 256. The updated version of the model may be designated as the current version for the next iteration, as indicated by arrow 257.

In at least some embodiments a pluggable and/or extensible clustering framework may be implemented at the machine learning service, in which different sub-algorithms or modules for some or all of the entities represented by the blocks shown in FIG. 2 may be used for different client data sets. For example, the basic iterative workflow shown in FIG. 2 may be employed for a generalized K-means algorithm for one data set, a generalized K-medians algorithm for a different data set, and so on. The set of resources selected for each set of computations (e.g., for distance calculations, or for model change accumulation) may vary from one iteration to another in some embodiments, e.g., based on available machine learning service resources or based on the expected processing requirements of the iteration. For example, a different set of execution platforms may be selected for iteration J than is selected for iteration (J+1). Additional details regarding various aspects of the operations indicated in FIG. 2 are provided below, including the kinds of data structures used for storing cluster representative information, distance computations, and the like.

FIG. 3 illustrates examples of data sets with high-dimensionality sparse attributes, according to at least some embodiments. Table 321 shows the raw tokens included in a "review" text attribute 301 for three observation records OR1, OR2 and OR3 of a data set. The token space for the review text attribute comprises all the different words which occur in the review attribute within the data set, with stop words such as "a", "at" and "but" eliminated. Each attribute value may be represented as a token vector which indicates the occurrence counts of individual tokens in the observation record. For example, observation record OR1 contains the text "Good product, at a great price". The tokens "good", "product", "great" and "price" of the token space each occur once in OR1. In the token space for the review attribute, "good" is represented as the token "t1", "product" as "t2", "great" as "t3", and "price" as "t4", so the token vector corresponding to OR1 comprises (t1:1, t2:1, t3:1, t4:1). Similar token vectors may be generated for each of the other observation records OR2 and OR3.

In Table 322, an example of a sparsely-distributed categorical attribute is shown. Unlike text attributes such as the review attribute of Table 321, the raw tokens of a categorical attribute such as "product tags" of Table 322 may comprise combinations of several words or phrases in some cases, such as "mother's day", "children's store", and so on. A token vector corresponding to each observation record OR100, OR101 and OR102 of Table 322 may be constructed using a similar approach as that indicated for the observation records of Table 321. In some traditional clustering algorithms, token vectors of the kinds shown in FIG. 3 may be used for generating distances of observation records from clusters, identifying new cluster representatives, and other operations of the clustering algorithm. However, storing complete token vectors may consume very large amounts of memory, and may not result in the levels of scalability needed to handle data sets with millions of records and hundreds of attributes. In various embodiments, instead of retaining all the token vectors corresponding to all the observation records for computing distances and assigning observation records to clusters, a condensed representation of the token vectors in the form of an approximate data structure such as a sketch may be generated, as discussed below in further detail.

Sketch Overview

Figure 4:
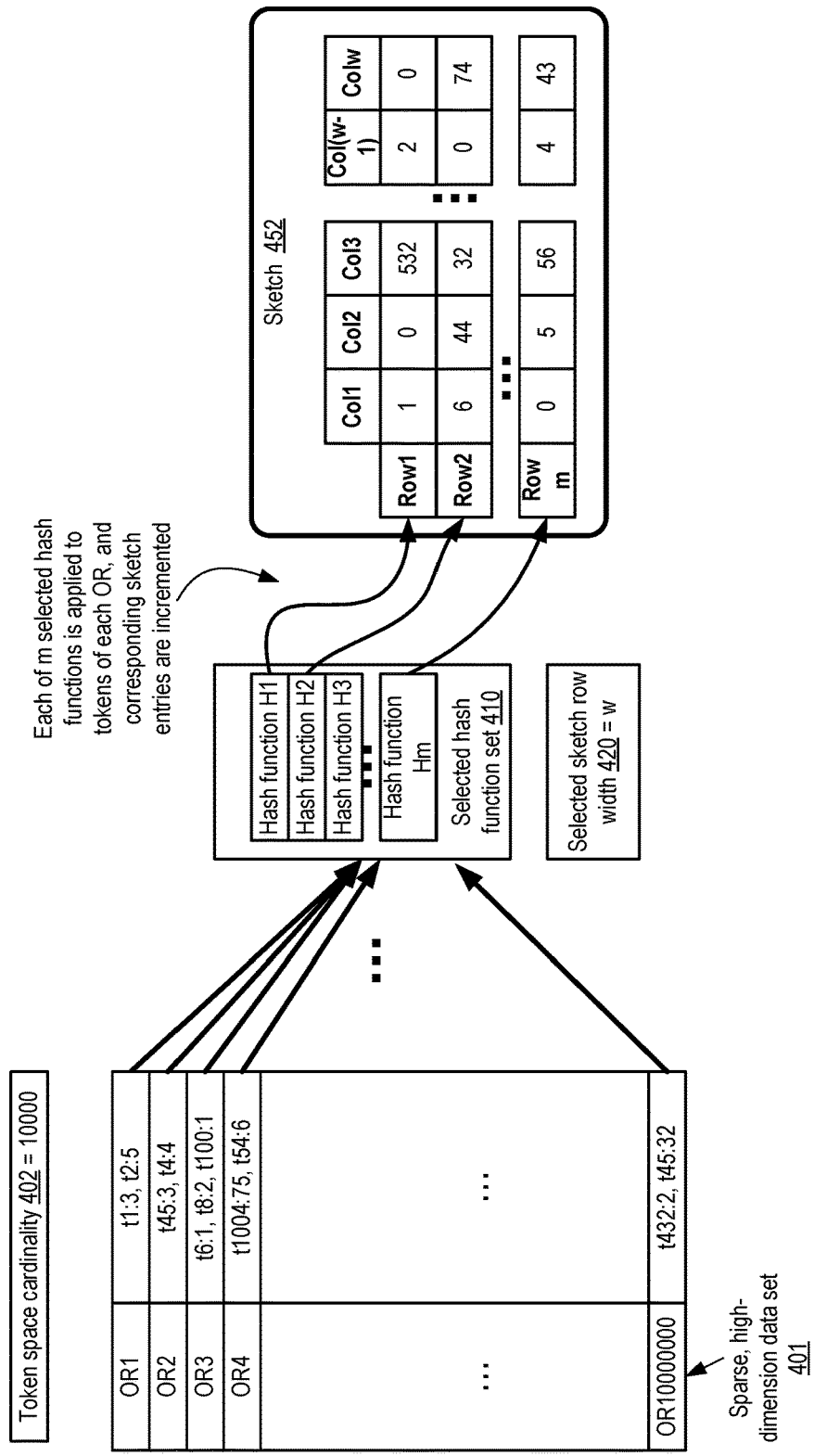
FIG. 4 illustrates an example sketch corresponding to a data set, according to at least some embodiments.

FIG. 4 illustrates an example sketch corresponding to a data set, according to at least some embodiments. A sketch is one example of an approximate data structure usable to generate a concise summary of a collection of data records such as a stream of observation records. The concise summary can then be used to obtain approximate responses to specific types of queries on the collection (such as the occurrence counts of various tokens) with probabilistic error bounds. Generally speaking, approximate data structures may be either randomizing (as in the case of the types of sketches discussed herein) or deterministic. A number of different types of sketches may be used in various embodiments, depending for example on the weights that may be assigned to the tokens. In FIG. 4, a count-min sketch is shown, although count sketches or AMS sketches may be used in various embodiments instead of or in addition to count-min sketches. In the embodiment depicted in FIG. 4, data set 401 comprises 10000000 observation records, each of which include a text attribute with a token space cardinality of 10000. In order to store full token vectors of the kind illustrated in FIG. 3, space proportional to the product of the observation record count and the token space cardinality may be required. Instead, a sketch 452 comprising (m times w) integers may be generated to represent the data set. The sketch comprises m rows of w integers each. The parameters w and m may be selected based on various factors at the machine learning service, e.g., based on the sizes of the data set and the token space, desired target limits on the error bounds, available memory at execution platforms, and so on. A set 410 of m distinct hash functions H1, H2, . . . , Hm may be selected for populating the sketch in the depicted embodiment. Any appropriate hash functions may be used in various embodiments, such as variants of Murmur hash functions, Fowler-Noll-Vo (FNV) hash functions, DJB hash functions (named for Daniel J. Bernstein, who introduced these functions), and the like.

Each of the selected hash functions H1, . . . , Hm may be used to generate the entries within a respective row of the sketch 452. For example, H1 may be used to populate entries of Row1, H2 may be used to populate the entries of Row2, and so on. When applied to a given token of an observation record, a given hash function may identify a particular index position within its row, and that entry may be incremented by the occurrence count (or weight) of the token in the depicted embodiment. A simple example of generating entries of a sketch similar to sketch 452 is provided in FIG. 6-FIG. 9 below. As more observation records of the data set 401 are examined, more entries of the sketch may be updated. Because some of the hash functions may map to the same index for different tokens, some information pertaining to the distinct token counts of the tokens may be lost when constructing a sketch such as 452. However, depending on factors such as the sparsity of the data, the quality of the hash functions, and the like, fairly accurate responses to queries regarding token counts (or, more generally, a respective aggregated score for individual tokens) may be provided using the sketches, while using less memory than would have been required for storing individual records for all the tokens.

For a model with K clusters, K corresponding sketches may be maintained (one for each cluster) in various embodiments. To populate the cluster data structures, the observation records (which may form a data stream as mentioned earlier) may be examined in order, and the appropriate sketch may be updated for each observation record based on the cluster assignment. During the distance computation phase, to estimate the distance between an instance and a cluster representative, the tokens that have non-zero associations with the observation record may be identified, and the appropriate cluster sketch may be queried to obtain the cluster's aggregated score for those tokens. The aggregated scores may be normalized in various embodiments, e.g., based on the cluster size or the combined weights of the observation records assigned to the cluster.

Hierarchical Representation of Clustering Model

Figure 5:
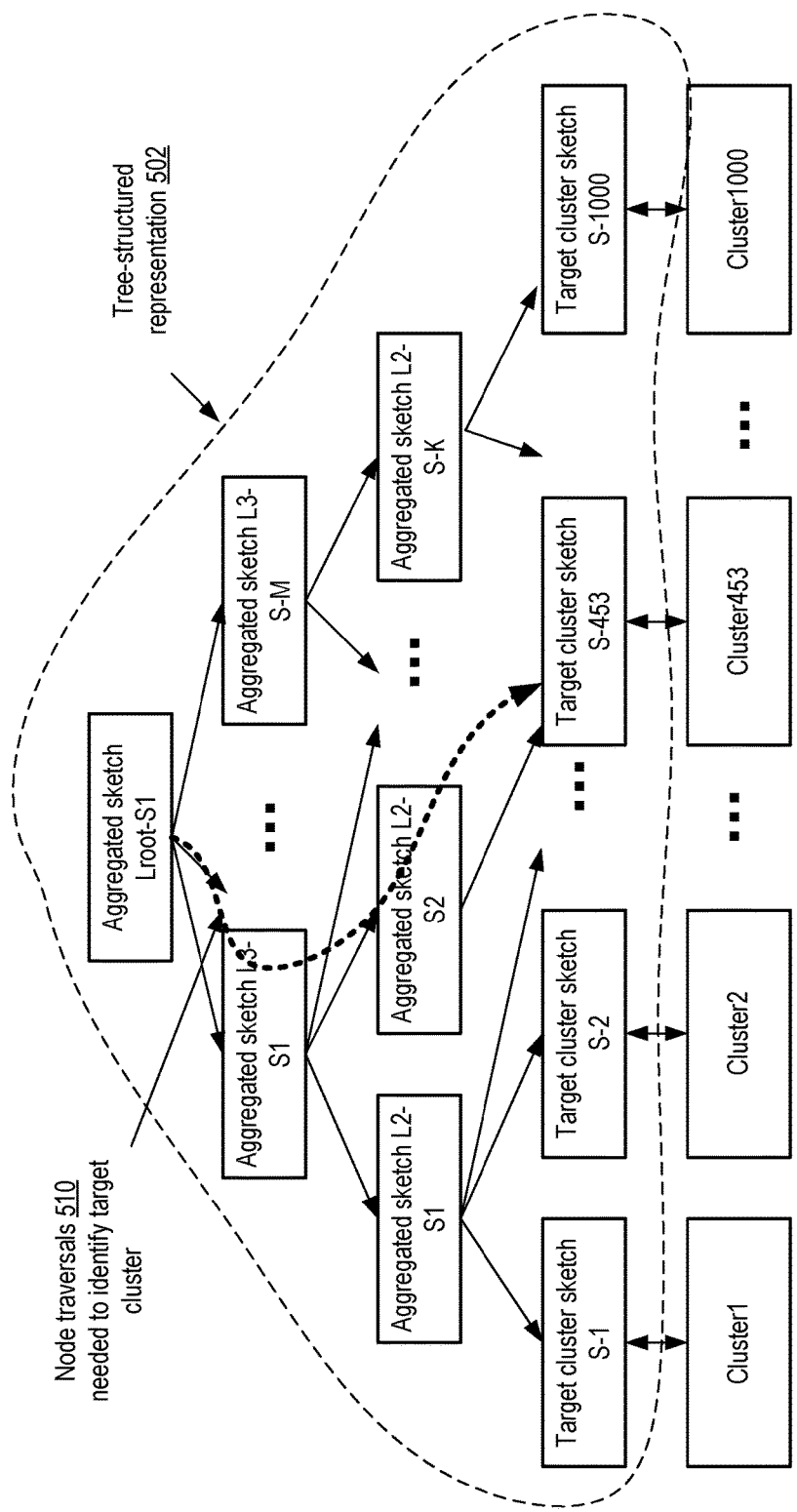
FIG. 5 illustrates an example tree-structured representation of a clustering model for sparse, high-dimensionality data, according to at least some embodiments.

In order to assign an observation record to a cluster, the distance of the observation metric from the cluster representatives of the different clusters in the current version of the model may have to be computed in some algorithms (for example, to assign the observation record to the cluster with the smallest distance). If the number of clusters is large, such calculations may be quite resource-intensive. In order to reduce the amount of processing needed for distance computations, a hierarchical representation of the cluster models may be employed in various embodiments. FIG. 5 illustrates an example tree-structured representation of a clustering model for sparse, high-dimensionality data, according to at least some embodiments. In the depicted embodiment, the observation records of a data set are to be distributed among 1000 different clusters Cluster1-Cluster1000.

A balanced tree-structured representation 502 of the clusters is generated in the depicted embodiment. The leaf level of the tree comprises 1000 nodes S-1 through S-1000, each corresponding to a respective cluster from among Cluster1-Cluster1000. Each leaf node may thus comprise a respective sketch. The tree may be constructed using either a bottom-up or a top-down approach in the depicted embodiment, in which a given non-leaf node at each level may be generated by applying an aggregation function (such as a union function) on the sketches of its child nodes. For example, the entries of aggregated sketch L2-S1 may be constructed by adding the contents of corresponding entries in sketches S-1, S-2 and other child nodes in the depicted embodiment, and the entries of aggregated sketch L1-S1 may be constructed by adding the contents of corresponding entries in sketches L2-S1 and other child nodes. The number of levels in the tree, and the average fan-out (number of child nodes) of the non-leaf nodes may be among the parameters selected by the machine learning service based on knowledge base entries in some embodiments.

When identifying the cluster to which a given observation record is to be assigned, the tree 502 may be traversed from the top down. At each level, distances of the observation record from the cluster representatives corresponding to child nodes of the current node (starting with the root node Lroot-S1) may be examined, and the particular child node to whose cluster the observation record would be assigned may be selected as the next node to traverse. For example, a particular observation record may be assigned to Cluster 453 after performing distance computations associated with Lroot-S1, L3-S1, and L2-S2 in the depicted embodiment, instead of performing 1000 different distance comparisons with each of the leaf-level sketches.

Sketch Generation Example

Figure 6:
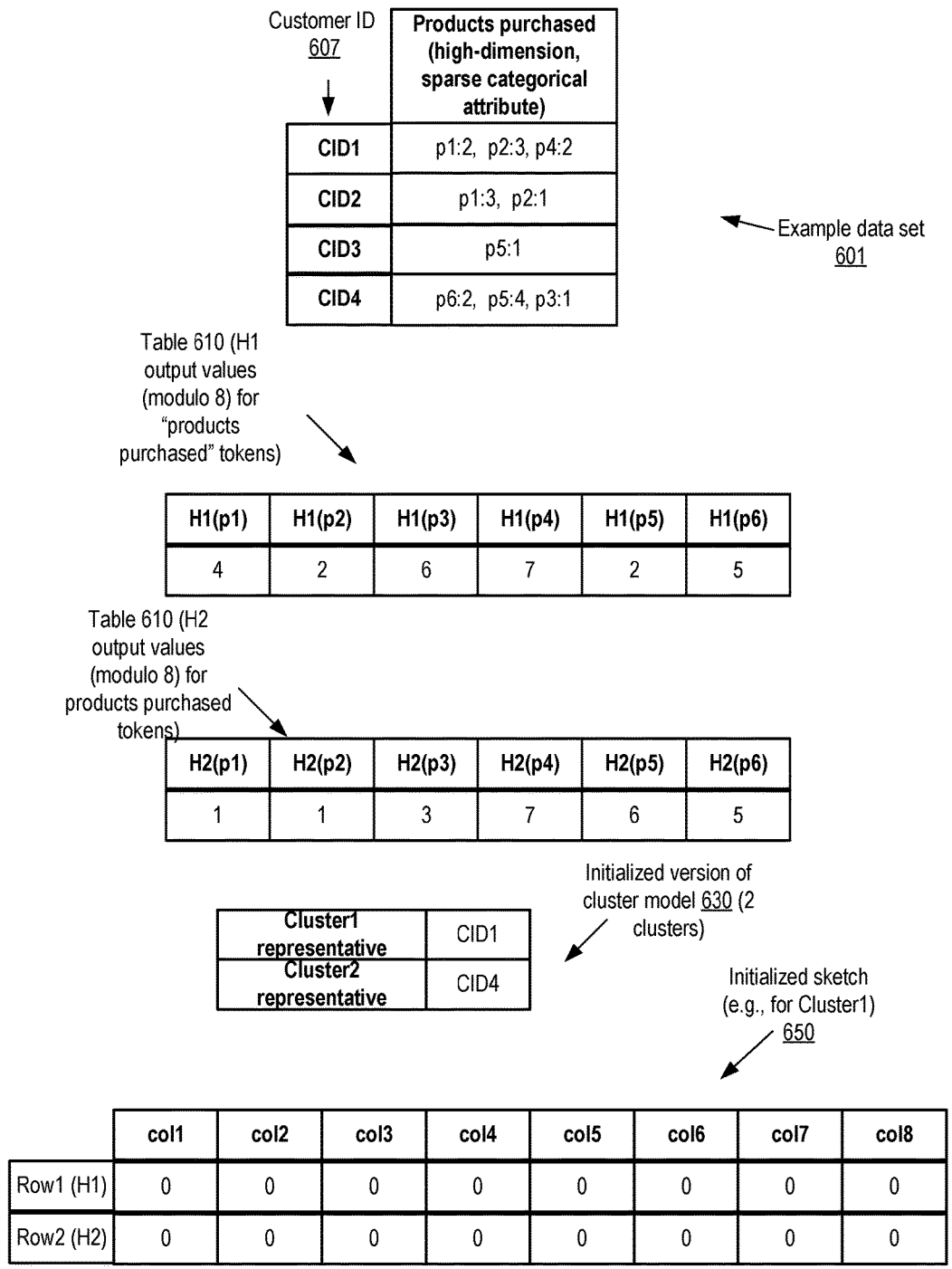
FIG. 6 illustrates an example of a simple data set for which a sketch may be generated using two hash functions, according to at least some embodiments.

FIG. 6 illustrates an example of a simple data set for which a sketch may be generated using two hash functions, according to at least some embodiments. Example data set 601 comprises four observation records corresponding to respective product purchase histories for four customers identified by customer identifiers CID1-CID4 indicated in column 607. The "products purchased" column indicates the different products that each customer has bought, and the number of times each of those products have been bought by that customer. Thus, for example, the customer identified by CID1 has purchased product p1 twice (resulting in the token vector entry p1:2), product p2 three times (resulting in the token vector entry p2:3), and product p4 twice (resulting in the token vector entry p4:2). The organization from which the products are purchased may sell tens of thousands or hundreds of thousands of products, and a given customer may typically only purchase a small fraction of the organization's product inventory; as a result, the products purchased attribute may meet the sparseness and high-dimensionality criteria for a sketch-based clustering algorithm to be employed.

The machine learning service has determined that a sketch employing two hash functions H1 and H2, in which the results of each of the hash functions are mapped to an 8-element row, will suffice for the clustering algorithm for data set 601 in the depicted embodiment. Thus, a 2×8 array of integers is to be used as the sketch data structure. The index values (among the 8 possible index values in each row Row1 or Row2) to which various tokens of the "products purchased" attribute are mapped by the respective hash functions H1 and H2 are shown in tables 610 and 612 respectively. For example, the token "p1" is mapped to index 4 by H1 and to index 1 by H2. These hashing results are used to set the corresponding sketch entry values as described below with respect to FIG. 7-FIG. 9.

Figure 7:
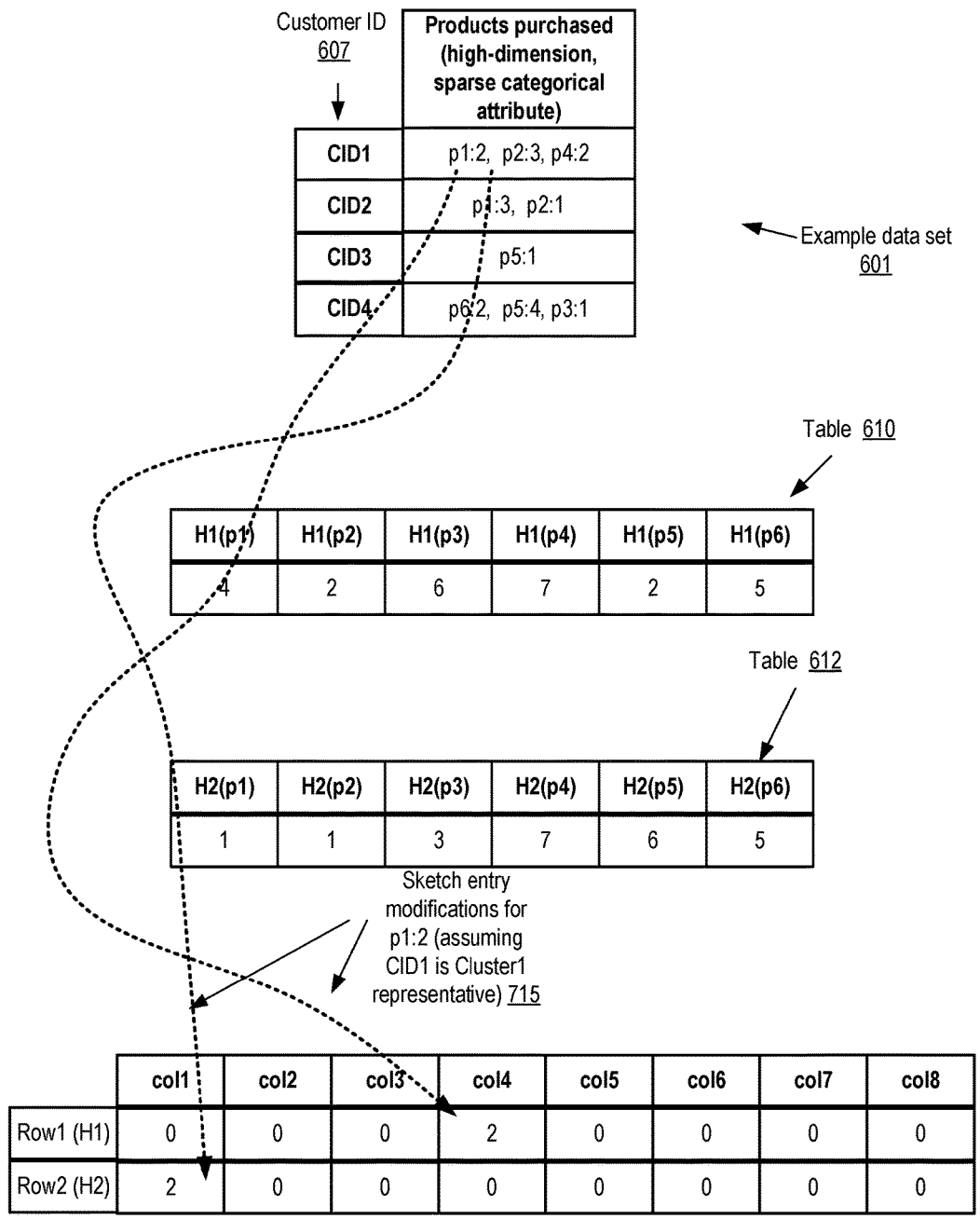
FIG. 7, FIG. 8 and FIG. 9 collectively illustrate examples of modifying entries of a sketch based on contents of a text attribute of the data set of FIG. 6, according to at least some embodiments.
Figure 8:
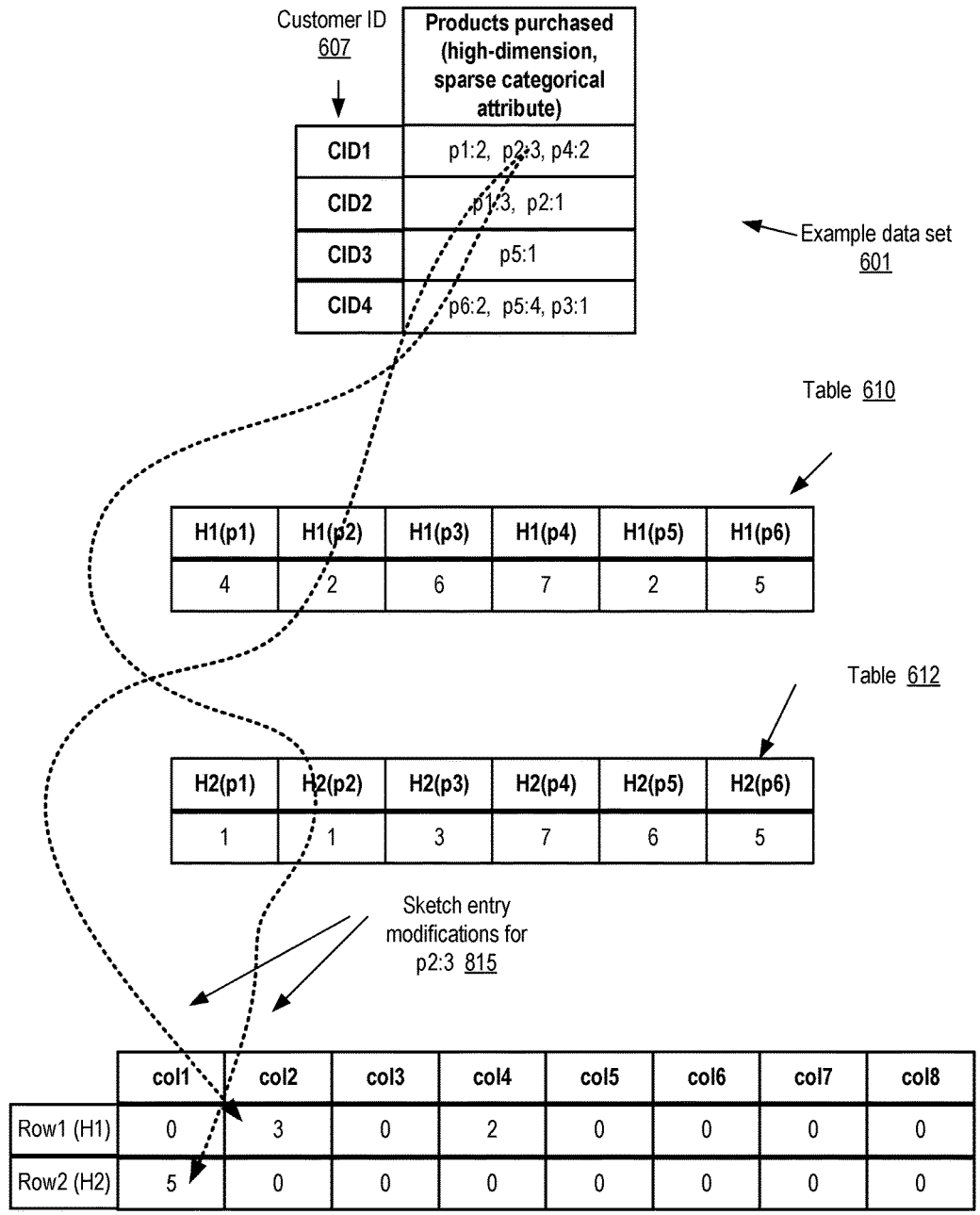
Figure 9:
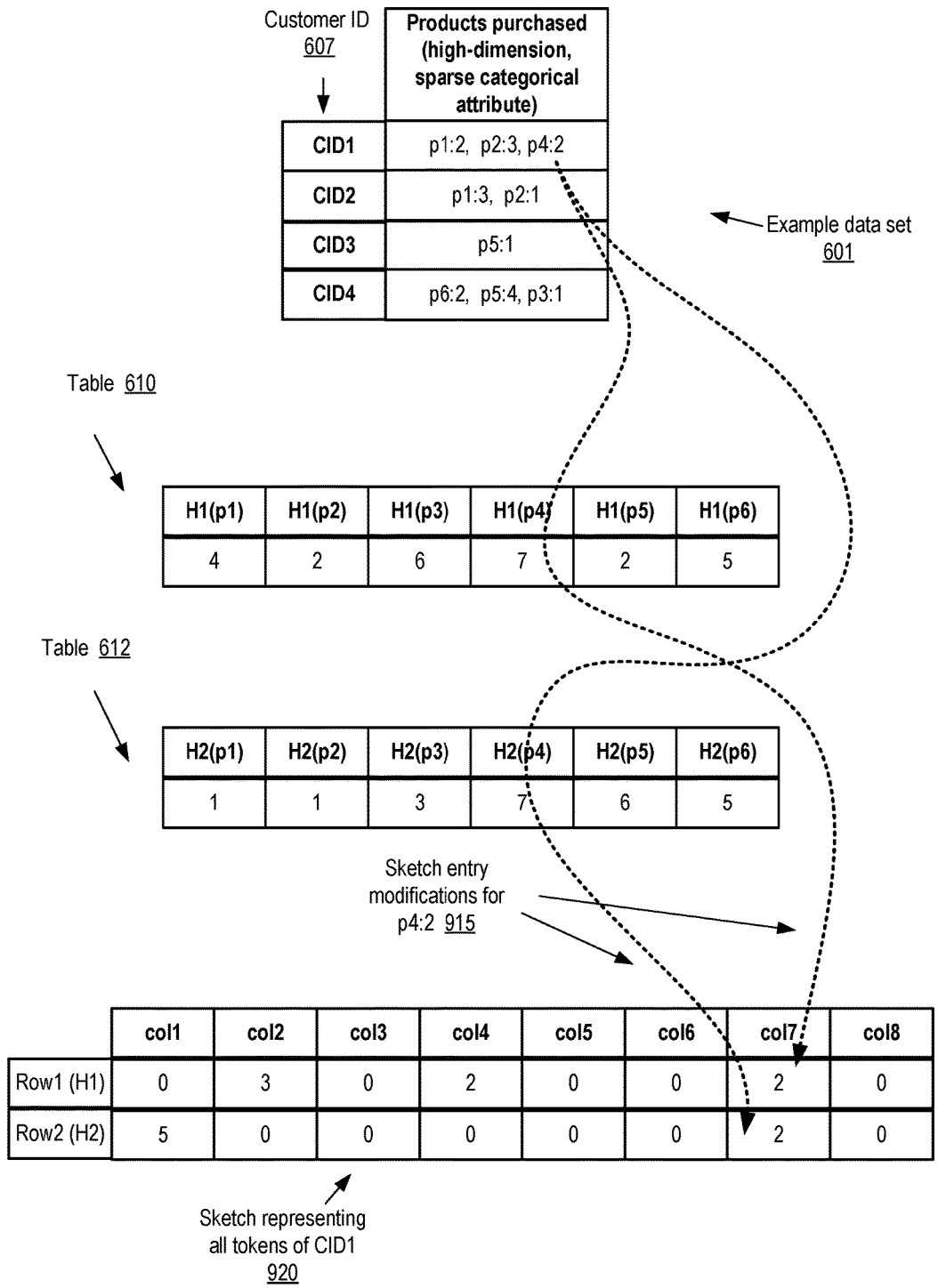

The number of clusters chosen for data set 601 is 2, as indicated in initial cluster model 630, with the observation records for CID1 and CID4 chosen (e.g., using random selection or some variant of a K-means++ approach) as the respective cluster representatives of Cluster1 and Cluster2 in the initial version of the model. An initialized version of the sketch 650 is shown, with all entries initially set to zero. To simplify the presentation, only a few of the steps required to populate the sketch for Cluster1 are illustrated in FIG. 7-FIG. 9. The initial version of the sketch for the second cluster Cluster2 would also consist of zeroes, and update operations similar to those shown in FIG. 7-FIG. 9 may be performed for Cluster2.

FIG. 7, FIG. 8 and FIG. 9 collectively illustrate examples of modifying entries of a sketch based on contents of a text attribute of the data set of FIG. 6, according to at least some embodiments. In FIG. 7, the modifications 715 resulting from the presence of token p1 in the observation record corresponding to CID1 are shown. Since hash function H1 maps p1 to index 4, and the number of occurrences of p1 in CID1's observation record is 2, the entry Row1 [4] is incremented by 2 (increased by one for each occurrence). Similarly, since H2 maps p1 to index 1, the entry Row2[1] is also incremented by 2 in the depicted example.

In FIG. 8, the entries corresponding to the presence of the token p2 in CID1's observation record are updated, as indicated by arrows 815. Since H1(p2) is 2, and p2 occurs three times in CID1's observation record, the second entry in Row1 (Row1 [2]) is incremented by 3. Similarly, since H2(p2) is 1, the first entry in Row2 is incremented by 3 as well. Note that H2(p1) and H2(p2) are both 1, so the effects of the presence of p1 and p2 with respect to H2 are both incorporated within Row2[1] in the depicted example. If the sketch is later queried for the number of occurrences of p1 or p2, the entry Row2[1] would not necessarily provide an accurate occurrence count. However, if H1's mapping of p1 and p2 do not clash with other mappings, it would still be the case that, by using the minimum among the entries to which p1 is mapped (or p2 is mapped), the exact occurrence counts for those two tokens could be obtained in the depicted embodiment. In general, the occurrence counts (and other similar measures) for various tokens of the token space may be obtained within known error bounds using sketches, despite the possibility of hash collisions.

In FIG. 9, entries of the sketch corresponding to the occurrences of token p4 are updated. Both H1(p4) and H2(p4) indicate that the $7^{th}$ entry in the respective rows of the sketch should be incremented for p4, so Row1 [7] and Row2[7] are both incremented by 2 (the occurrence count of p4 in the observation record corresponding to cluster representative CID1). A second sketch corresponding to the second cluster representative (e.g., the observation record for CID4) may be prepared similarly.

The entries in the two sketches may be normalized for distance computations, e.g., using respective L2 norms, in various embodiments. For each of the two sketches, a respective normalizing function NF1 and NF2 may be identified. Consider the case where the distance of the observation record associated with CID2 from the cluster representative of Cluster1 is to be computed. Since CID2's record contains three instances of p1 (p1:3) and one instance of p2 (p2:1), the distance from the cluster representative may be computed in some embodiments using a formula similar to the following on the sketch for Cluster1:

$$\text{Distance } d = (3*\text{median}(\text{Row1}[H1(p1)], \text{Row2}[H2(p1)]) + 1*\text{median}(\text{Row1}[H1(p2)], \text{Row2}[H2(p2)]))/NF1.$$

Similarly, the distance of CID2's record from the second sketch, representing Cluster2's representative, may also be obtained using medians based on the entries of the second cluster corresponding to p1 and p2, and the corresponding normalization function. In other embodiments, other formulas (e.g., formulas that use other aggregation or summarization functions than the median function) may be used. The computed distances may then be used to assign each observation record to the appropriate cluster (i.e., the one with the smallest distance), and the cluster representatives of the current version may be modified based on the most recent assignments.

Sketch Pairs

Figure 10:
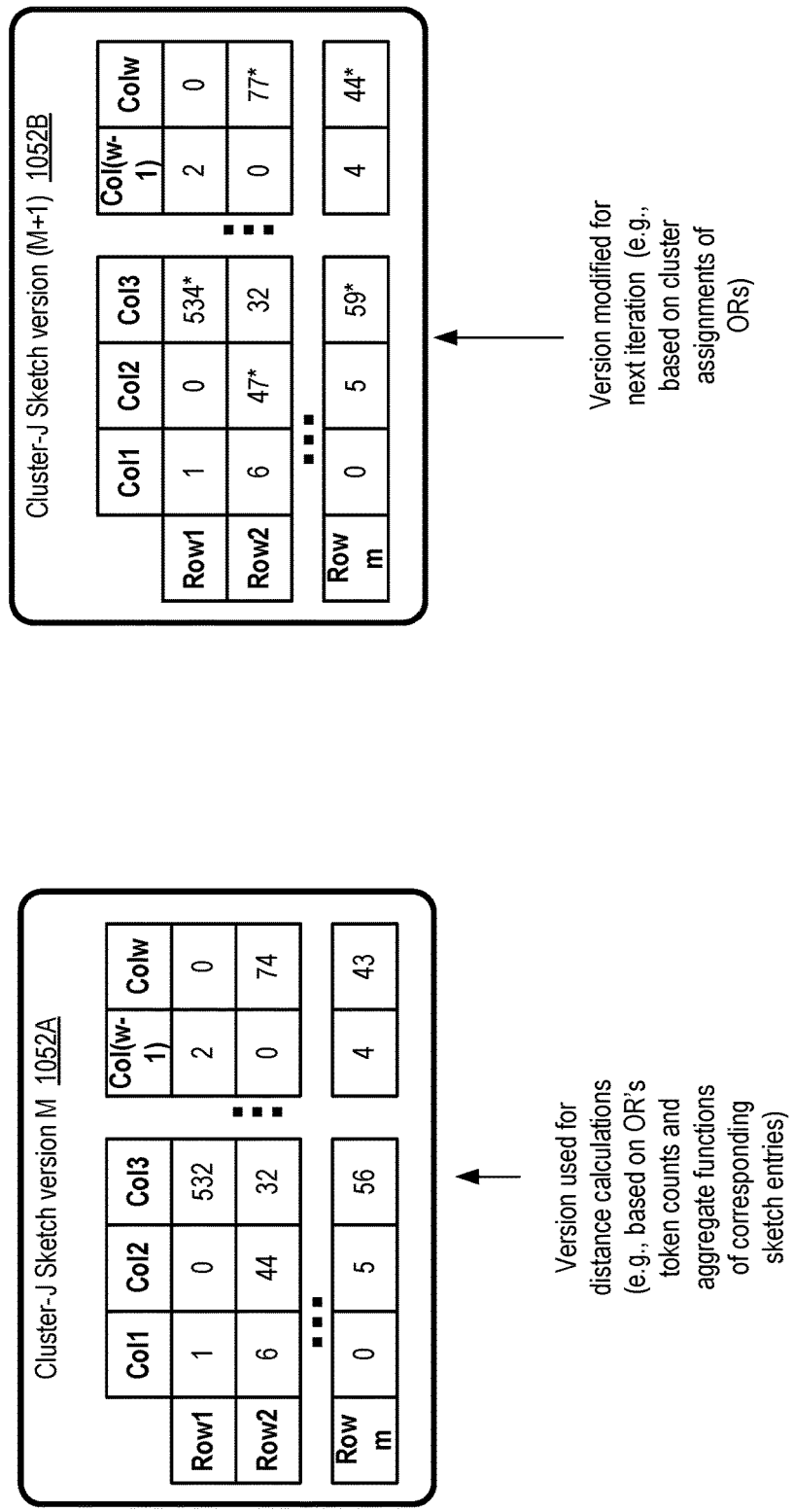
FIG. 10 illustrates the use of a pair of sketches during a particular iteration of a clustering methodology, according to at least some embodiments.

As indicated earlier, many of the clustering algorithms used for sparse high-dimensionality data sets may be iterative in nature. FIG. 10 illustrates the use of a pair of sketches during a particular iteration of a clustering methodology, according to at least some embodiments. One sketch 1052A of the pair represents the current version (version M) of a particular cluster ClusterJ; this version may be used for computing distances of observation records from the cluster using metrics selected by the machine learning service during the current iteration. As and when observation records are assigned to a given cluster such as ClusterJ, the values of the sketch entries for that cluster may be modified within a second sketch 1052B, which corresponds to the next version (version M+1). For example, among the sketch entries illustrated in FIG. 10, the Row1 [Col3] entry is changed from 532 to 534 in version (M+1), the Row2[Col2] entry is changed from 44 to 47, the Row2[Colw] entry is changed from 74 to 77, the Rowm[Col3] entry is increased from 56 to 59, while the Rowm[Colw] entry is set to 44 instead of 43. In some embodiments in which tree-structured representations of the cluster model (similar to the example tree shown in FIG. 5) are maintained, a pair of sketches may be maintained for each of the tree nodes.

Programmatic Interfaces

As mentioned earlier, a number of different types of programmatic interfaces may be implemented by the clustering manager or other components of the machine learning service for client interactions in various embodiments. FIG. 11 illustrates an example programmatic interface which may be implemented at a machine learning service which supports scalable clustering for sparse high-dimensionality data, according to at least some embodiments. The interface may include a web page 1100 with an introductory message area 1105, data source information section 1107, parameter overview section 1109 and parameter entry section 1111, as well as a web control 1113 to request initiation of training for a clustering model.

Introductory message area 1105 may request the client to provide information about the source from which the observation records which are to be clustered can be obtained by the machine learning service. In the depicted embodiment, the details that the client may specify regarding the data source may include a data source name (e.g., any identifier of the client's choice, as long as the identifier is not already in use), a data source type (e.g., a streaming data source or a static pre-collected data source), the network address (e.g., indicated by a URL or uniform resource locator) or device name at which the data source is accessible, and/or a record schema for the observation records (e.g., the names, data types and/or sequence of the attributes). Schemas may be indicated in various formats in different embodiments—e.g., in XML (Extensible Markup Language) or a variant, in JSON (JavaScript Object Notation), in a data definition language similar to that used in SQL (Structured Query Language)-based databases, or in a custom schema description language implemented by the machine learning service.

In parameter overview section 1109, the client may be informed that the machine learning service can select defaults for various parameters of the clustering exercise, such as the type of clustering algorithm, the number of clusters, etc., but that the client may override the defaults for various decisions if desired. As shown in region 1111, the default choices made by the service may include, for example, some combination of an automatically-generated model name (based on the client's user name, for example), the clustering methodology (e.g., spherical K-means using sketches), the number of clusters (1000), the initialization algorithm (Random selection), the number of clustering iterations (5) to be completed before reporting interim results to the client, the clustering quality metric to be displayed in the results (a normalized mutual information metric), the type of sketch data structure to be used (e.g., count-min), the number of levels in the tree representation of the cluster model (4), and so on.

In some implementations, some of the default parameter values may be selected after the machine learning service has performed a preliminary analysis (e.g., including checking the actual or estimated data set size and/or examining the schema) of at least a portion of the data set, so it may take some time after the client has indicated the data source details for the default entries of region 1111 to be generated. In at least one embodiment, a client need not necessarily provide a schema, and the machine learning service may deduce the schema after examining some number of observation records and then use the schema for parameter selection. For some of the parameters, a drop-down list of supported or available options may be provided to the client if the client wishes to override the default settings selected by the service. After the client has made any desired changes (or if the client agrees with the default settings), control 1113 may be used to start the clustering iterations to train the model in the depicted embodiment.

A number of additional web-based interfaces may also be implemented for client interactions in various embodiments. One such programmatic interface may be used to provide an indication of interim clustering results, according to at least some embodiments, to display recommendations as to whether additional iterations should be run, and to enable the client to indicate whether the recommendations are to be implemented or not. Other web-based interfaces may be provided to allow clients to browse the current set of clusters, e.g., to view how many observation records are assigned to each cluster, which attributes or tokens are the most significant contributors towards the clustering decisions, and so on. It is noted that in various embodiments, the kinds of information indicated in the web page shown in FIG. 11, or in the other kinds of web pages discussed above, may also or instead be provided to clients via APIs, command-line tools, or non-web-based graphical user interfaces.

Methods for Efficient Clustering of Sparse High-Dimensional Data

Figure 12:
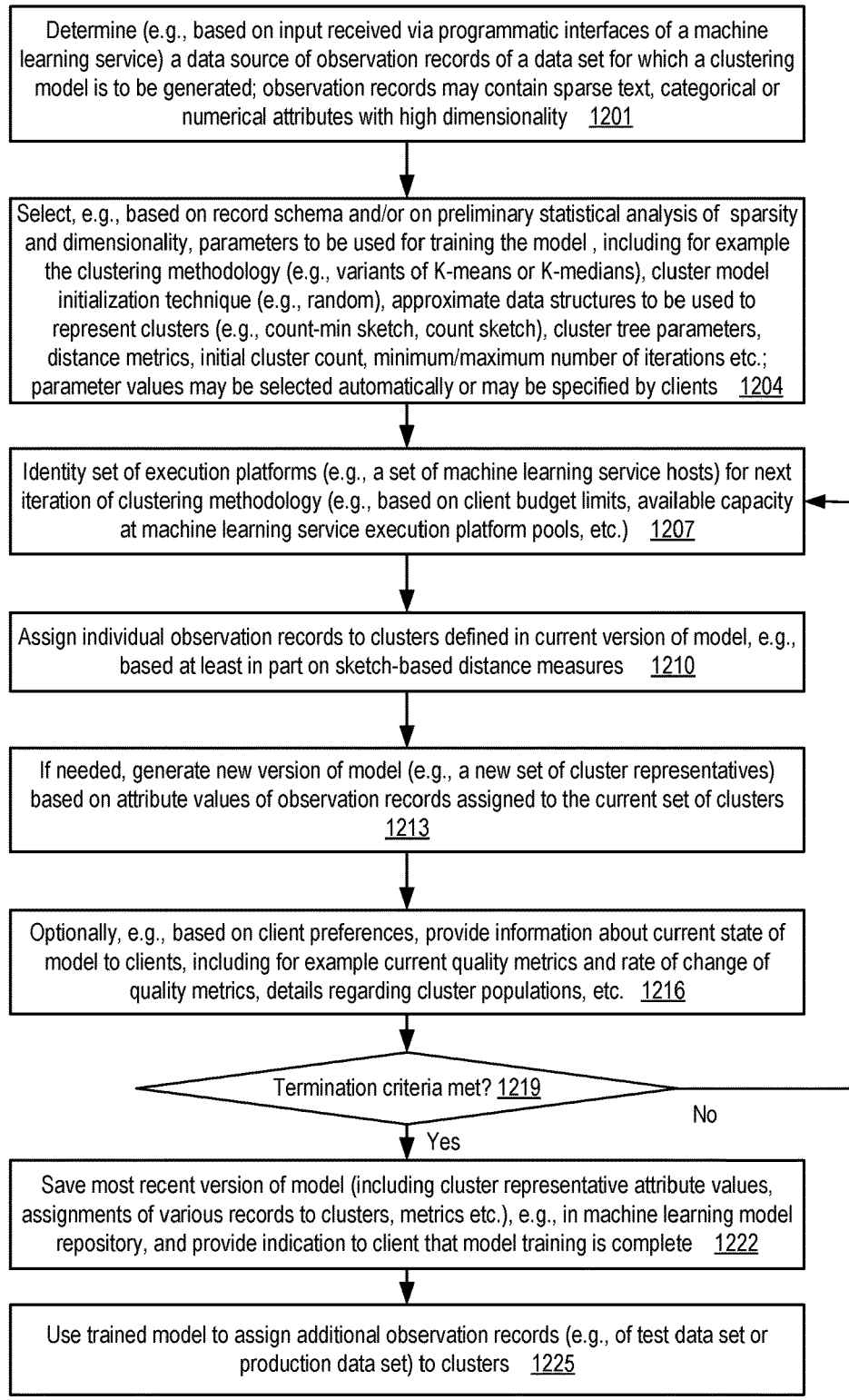
FIG. 12 illustrates aspects of operations that may be performed to implement a scalable clustering methodology for sparse high-dimensionality data, according to at least some embodiments.

FIG. 12 illustrates aspects of operations that may be performed to implement a scalable clustering methodology for sparse high-dimensionality data, according to at least some embodiments. As shown in element 1201, components of the machine learning service of a provider network, such as a clustering manager, may identify a data source from which observation records of a data set which is to be distributed among clusters can be obtained. An observation record of the data set may include, for example, one or more attributes whose constituent tokens are sparsely distributed over a token space with high dimensions. Such sparse high-dimensionality attributes may include, for example, text attributes, categorical attributes, or numeric attributes. A number of different types of data sources may be supported in various embodiments, including streaming data sources whose observation records are collected dynamically from one or more network endpoints, static data sets which have been collected in advance and stored at one or more storage devices (e.g., using a storage service or a database service of the provider network). In some embodiments, the service may obtain an indication of the data source from a client via one or more programmatic interfaces such as a web-based console or web page, a set of APIs, a command-line tool or a graphical user interface.

The clustering manager may select parameters to be used to train a clustering model of the data set (element 1204), e.g., without receiving explicit guidance or recommendations for the parameters from the client on whose behalf the clustering is to be implemented. For example, the clustering algorithm or methodology (e.g., a generalized or multi-attribute version of the K-means algorithm using sketches or other approximate data structures to represent clusters, or a similarly generalized version of the K-medians algorithm), the cluster model initialization technique (e.g., random selection), the kinds of approximate data structures or sketches to be used (e.g., count-min, count, or AMS sketches), the number of clusters among which the observation records are to be distributed, whether hierarchical structures such as trees are to be used to reduce distance computation costs, the number of levels and fan-out levels for such representations, respective distance metrics corresponding to the various attribute types (e.g., numeric, categorical, binary/Boolean, and text or text-like attributes) represented in the observation records, normalization factors or weights, the minimum or maximum number of algorithm iterations, the termination criteria to be used to stop performing additional clustering iterations, and/or other parameters may be determined by the service. A technique for generating a combined or aggregated distance metric from the individual per-attribute distance metrics may be identified in various embodiments, e.g., using normalization factors selected for the different distance metrics for individual attributes. In at least some embodiments, clients may be provided an opportunity to modify some of the default choices made by the service—e.g., the default choices may be displayed via a web page which provides form fields or entry mechanisms allowing the client to override one or more of the default choices.

After the parameters have been identified, one or more iterations of the selected clustering algorithm may be implemented. The clustering manager may select the particular set of execution platforms to be used for the next iteration (element 1207) from a pool of execution platforms available at the machine learning service, e.g., based on the fraction of the pool's platforms that are free, the client's budget or resource constraints, and/or the expected computation requirements of the iteration. The set of execution platforms allocated may be scaled automatically in some embodiments, depending for example on the data set size, the relative progress made towards convergence, and so on. Network connections may be established as needed between the execution platforms and the data sources. Within the iteration, the observation records may be assigned to clusters of the current version of the model based on computations of the distances of the records from the current version's cluster representatives (element 1210). The distances may be computed using the sketches or other approximate data structures in various embodiments. A new version of the clustering model (with at least one changed cluster representative) may be generated using some function of the attribute values of the observation records assigned to the clusters (element 1213).

Optionally, for example based on client preferences, information about the current state of the model (such as a mutual information metric computed for the model, the rate of change of model quality over some number of previous iterations, etc.) may be indicated via programmatic interfaces of the clustering manager to a client (element 1216) at the end of some or all iterations. If the termination criteria for the model are met, as detected in element 1219, the current version of the model and the cluster assignments of the observation records may be stored at a persistent repository (element 1222), e.g., at an artifact repository of the machine learning service. In some embodiments the service may select the termination criteria, while in other embodiments clients may indicate termination criteria via programmatic interfaces. The trained version of the model may later be used to assign additional observation records (e.g., of a test data set or a production data set) to clusters (element 1225). If the termination criteria are not met (as also detected in operations corresponding to element 1219), and resources for the clustering algorithm have not yet been exhausted, one or more additional iterations may be performed in the depicted embodiment—for example, the operations corresponding to elements 1207 onwards may be repeated.

It is noted that in various embodiments, some of the operations shown in FIG. 12 may be implemented in a different order than that shown in the figure, or may be performed in parallel rather than sequentially. Additionally, some of the operations shown in FIG. 12 may not be required in one or more implementations.

Use Cases

The techniques described above, of utilizing resources of a machine learning service to implement scalable clustering algorithms on data sets with sparse high-dimensionality attributes, may be useful in a variety of environments. Many problem domains being addressed using machine learning, including, for example, so-called deep learning applications, national security-related applications, and the like may require analysis and cluster assignment for millions of observation records, each of which in turn may include attributes (such as text or categorical attributes) with very large token spaces and sparse distributions of the tokens within the token space. The clients on whose behalf the clustering is to be performed may not always be experts in machine learning or statistics, and it may not be straightforward for them to select the kinds of clustering algorithms and parameters to use. The machine learning service may include a knowledge base whose entries reflect prior experience with hundreds or thousands of similar data sets and clustering attempts, and it may therefore be possible for the service to select default parameters, algorithms and data structures which are likely to work well on any given new data set. For example, the service may opt to use sketches or other similar approximate or probabilistic data structures to represent the clusters, which may result in substantial reductions with respect to memory requirements. In addition, to reduce the amount of processing required for distance computations, the service may choose to use a hierarchical (e.g., tree-structured) representation of the cluster model. The implementation of easy-to-use interfaces that enable clients to examine the current state of the clustering effort, and make decisions as to whether resources should be deployed for additional iterations of the selected clustering algorithms, may allow different clients to gain insights into the cluster populations and inter-cluster differences, and to control their clustering-related costs.

Illustrative Computer System

Figure 13:
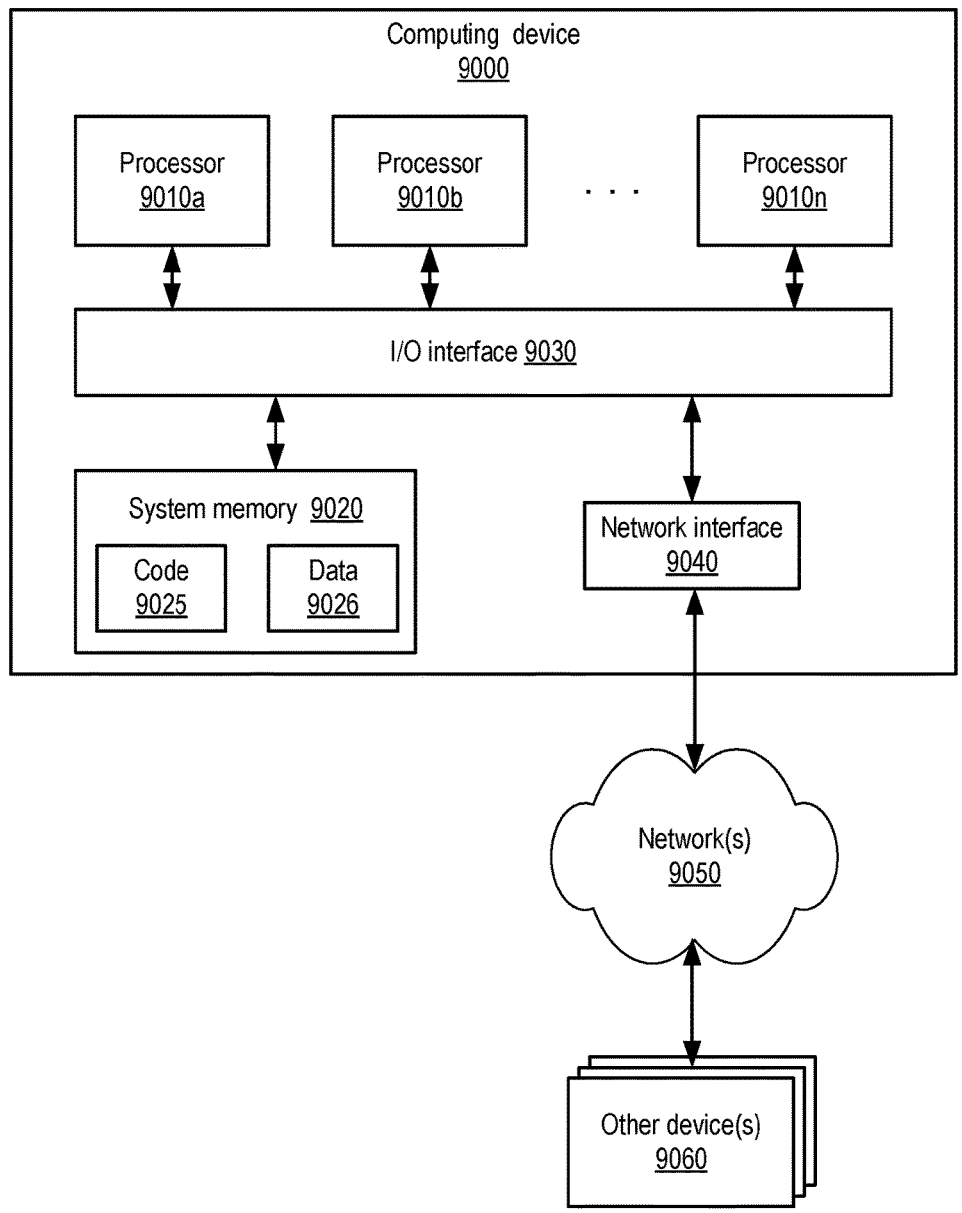
FIG. 13 is a block diagram illustrating an example computing device that may be used in at least some embodiments.

In at least some embodiments, a server that implements one or more of the techniques described above for generating cluster models for sparse high-dimensionality data (including for example clustering managers, execution platforms and other components of a machine learning service) may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a machine learning service implemented at a provider network;
wherein the one or more computing devices are configured to:
determine that a data set meets one or more of: (a) a high-dimensionality criterion or (b) a sparseness criterion, wherein the data set comprises a plurality of observation records;
select, based at least in part on an analysis of a schema associated with the data set, one or more of: (a) a distance metric to be used to assign individual observation records of the data set to clusters, or (b) a particular type of sketch data structure to be used to represent a cluster of observation records of the data set;
generate a tree-structured representation of a plurality of clusters, wherein the tree-structured representation comprises a plurality of nodes including one or more leaf nodes and one or more non-leaf nodes, wherein the one or more leaf nodes represent respective members of a target group of clusters to which observation records of the data set are to be assigned, wherein a particular non-leaf node is generated by applying an aggregation function to contents of one or more child nodes of the particular non-leaf node, and wherein an individual node of the plurality of nodes (a) indicates a cluster representative of a corresponding cluster and (b) comprises an instance of the particular type of sketch data structure;
perform, using the data set as input, a plurality of iterations of a selected clustering methodology, wherein an individual iteration of the plurality of iterations comprises:
determining respective distance metrics between a particular observation record and cluster representatives of one or more nodes of the plurality of nodes based at least in part on their respective sketch data structures;
assigning, based at least in part on the respective distance metrics, the particular observation record to a particular cluster of the plurality of clusters; and
updating sketch data structures of at least one of the plurality of nodes of the tree-structured representation as a result of the assigning;
in response to determining that a termination criterion of the selected clustering methodology has been met, store, with respect to one or more observation records of the data set, a respective indication of assignment of the observation record to a particular cluster of the target group of clusters; and
causing a user interface to display clustering results of the data set, wherein the user interface is configured to permit browsing of the plurality of clusters.

2. The system as recited in claim 1, wherein said assigning the particular observation record to the particular cluster comprises examining a first version of the tree-structured representation, and wherein said updating the one or more nodes of the tree-structured representation comprises modifying a second version of the tree-structured representation.

3. The system as recited in claim 1, wherein the particular type of sketch data structure comprises one or more of: (a) a count-min sketch, (b) a count sketch, or (c) an AMS (Alon Matias Szegedy) sketch.

4. The system as recited in claim 1, wherein the one or more computing devices are configured to:
receive an indication, from a client of the machine learning service via a programmatic interface, of a streaming data source from which the data set is to be obtained; and
establish a network connection to the streaming data source to obtain the data set.

5. The system as recited in claim 1, wherein the one or more computing devices are configured to:
determine that a second data set meets one or more of: (a) the high-dimensionality criterion or (b) the sparseness criterion, wherein the second data set comprises a second plurality of observation records;

select one or more of: (a) a distance metric to be used to assign individual observation records of the second data set to clusters, or (b) a type of sketch data structure to be used to represent a cluster of observation records of the second data set;

determine, based at least in part on a target number of clusters to which observation records of the second data set are to be assigned, that a tree-structured representation of a plurality of clusters is not to be generated for the second data set; and perform, using the second data set as input, a plurality of iterations of the selected clustering methodology, without generating a tree-structured representation of a plurality of clusters.

6. A method, comprising:

performing, by one or more computing devices:

selecting a particular type of sketch data structure to be used to represent a cluster of observation records of a data set, wherein the data set includes a plurality of observation records, wherein an individual observation record of the plurality of observation records is to be assigned to a cluster selected from a target group of clusters;

generating a hierarchical representation of a plurality of clusters, wherein one or more clusters of the plurality of clusters are members of the target group of clusters, wherein the representation comprises a plurality of nodes, and wherein a particular node of the plurality of nodes (a) indicates a cluster representative of a corresponding cluster and (b) comprises an instance of the particular type of sketch data structure;

executing, using the data set as input, a plurality of iterations of a selected clustering methodology, wherein an individual iteration of the plurality of iterations comprises:

determining respective distance metrics between a particular observation record and cluster representatives of one or more nodes of the plurality of nodes based at least in part on their respective sketch data structures, wherein the respective distance metrics are obtained at least in part by traversing the hierarchical representation of the plurality of clusters;

assigning, based at least in part on the respective distance metrics, the particular observation record to a particular cluster of the target set of clusters; and updating sketch data structures of at least some of the plurality of nodes of the hierarchical representation as a result of the assigning;

in response to determining that a termination criterion of the selected clustering methodology has been met, storing, with respect to one or more observation records of the data set, a respective indication of assignment of the observation record to a selected cluster of the target group of clusters; and causing a user interface to display clustering results of the data set, wherein the user interface is configured to permit browsing of the plurality of clusters.

7. The method as recited in claim 6, further comprising performing, by the one or more computing devices:

selecting, based at least in part on a schema of the data set, a type of distance metric to be used to assign the particular observation record to a cluster.

8. The method as recited in claim 6, wherein a type of distance metric used to assign the particular observation record to the particular cluster comprises one or more of: (a) a cosine similarity metric or (b) a Bregman divergence metric.

9. The method as recited in claim 6, wherein said selecting the particular type of sketch data structure is based at least in part on a property of a set of weights assigned to observation records of the data set.

10. The method as recited in claim 6, wherein the particular type of sketch data structure comprises one or more of: (a) a count-min sketch, (b) a count sketch, or (c) an AMS (Alon Matias Szegedy) sketch.

11. The method as recited in claim 6, wherein the hierarchical representation of the plurality of nodes representing the plurality of clusters comprises a balanced tree structure, wherein a particular cluster of the target group of clusters comprises a leaf node of the balanced tree.

12. The method as recited in claim 6, further comprising performing, by the one or more computing devices:

selecting, for a particular iteration of the plurality of iterations, one or more execution platforms from a pool of execution platforms of a machine learning service.

13. The method as recited in claim 6, wherein the selected clustering methodology comprises a use of one or more of: (a) a K-means algorithm, (b) a K-medians algorithm, (c) a K-harmonic-means algorithm, or (d) a MeanShift algorithm.

14. The method as recited in claim 6, wherein the observation records of the data set are assigned to the target group of clusters on behalf of a particular client of a clustering service, further comprising performing, by the one or more computing devices:

determining a number of clusters to be included in the target group of clusters, without receiving an indication of the number of clusters from the particular client.

15. The method as recited in claim 6, wherein the particular observation record comprises one or more of: (a) a text attribute, (b) a numerical attribute, (c) a binary attribute, or (d) a categorical attribute.

16. A non-transitory computer-accessible storage medium storing program instructions that when executed on one or more processors:

select a particular type of approximate data structure to be used to represent a cluster of observation records of a data set, wherein the data set includes a plurality of observation records, wherein an individual observation record of the plurality of observation records is to be assigned to a cluster selected from a target group of clusters;

generate a hierarchical representation of a plurality of clusters, wherein one or more clusters of the plurality of clusters are members of the target group of clusters, wherein the hierarchical representation comprises a plurality of nodes, and wherein an individual node of the plurality of nodes (a) indicates a cluster representative of a corresponding cluster and (b) comprises an instance of the particular type of approximate data structure;

execute, using the data set as input, a plurality of iterations of a selected clustering methodology, wherein an individual iteration of the plurality of iterations comprises:

determining respective distance metrics between a particular observation record and cluster representatives of one or more nodes of the plurality of nodes based at least in part on their respective approximate data structures, wherein the respective distance metrics are obtained at least in part using the hierarchical representation of the plurality of clusters;

assigning, based at least in part on the respective distance metrics, the particular observation record to a particular cluster of the target set of clusters; and updating sketch data structures of at least some of the plurality of nodes of the hierarchical representation as a result of the assigning;

in response to a determination that a termination criterion of the selected clustering methodology has been met, store, with respect to one or more observation records of the data set, a respective indication of assignment of the observation record to a selected cluster of the target group of clusters; and causing a user interface to display clustering results of the data set, wherein the user interface is configured to permit browsing of the plurality of clusters.

17. The non-transitory computer-accessible storage medium as recited in claim 16, wherein the particular type of approximate data structure comprises one or more of: (a) a count-min sketch, (b) a count sketch, or (c) an AMS (Alon Matias Szegedy) sketch.

18. The non-transitory computer-accessible storage medium as recited in claim 16, wherein the hierarchical representation of a plurality of clusters comprises a balanced tree with one or more leaf nodes and one or more non-leaf nodes, wherein a particular leaf node of the balanced tree corresponds to a particular cluster of the target group of clusters and wherein a cluster representative corresponding to a particular non-leaf node of the balanced tree is derived from respective cluster representatives of one or more child nodes of the particular non-leaf node.

19. The non-transitory computer-accessible storage medium as recited in claim 16, wherein the instructions when executed on one or more processors:

receive, via a programmatic interface from a client, an indication of the termination criterion.

20. The non-transitory computer-accessible storage medium as recited in claim 16, wherein the instructions when executed on one or more processors:

select, for executing a particular iteration of the selected clustering methodology, one or more execution platforms from a pool of execution platforms of a machine learning service of a provider network; and delete, from the one or more execution platforms after at least a subset of computations associated with the particular iteration have been completed, one or more observation records of the data set in accordance with a security policy of the machine learning service.

\* \* \* \* \*